(12) United States Patent
Edelsbrunner et al.

(10) Patent No.: US 8,004,517 B1
(45) Date of Patent: Aug. 23, 2011

(54) METHODS, APPARATUS AND COMPUTER PROGRAM PRODUCTS THAT MODEL THREE-DIMENSIONAL SURFACE STRUCTURES

(75) Inventors: Herbert Edelsbrunner, Chapel Hill, NC (US); Michael Facello, Durham, NC (US); Tobias Gloth, Durham, NC (US); Zsolt Terek, Budapest (HU); Tamas Varady, Budapest (HU)

(73) Assignee: Geomagic, Inc., Research Triangle Park, NC (US)

( * ) Notice: Subject to any disclaimer, the term of this patent is extended or adjusted under 35 U.S.C. 154(b) by 542 days.

(21) Appl. No.: 11/426,094

(22) Filed: Jun. 23, 2006

Related U.S. Application Data

(60) Provisional application No. 60/694,123, filed on Jun. 24, 2005, provisional application No. 60/747,118, filed on May 12, 2006.

(51) Int. Cl.
*G06T 15/00* (2011.01)
*G09G 5/00* (2006.01)

(52) U.S. Cl. ......... 345/419; 345/581; 345/606; 345/611

(58) Field of Classification Search .................. 345/419, 345/581, 606, 611
See application file for complete search history.

(56) References Cited

U.S. PATENT DOCUMENTS

| | | | | |
|---|---|---|---|---|
| 3,931,697 | A * | 1/1976 | Pearce | 52/81.1 |
| 5,377,118 | A * | 12/1994 | Leon et al. | 700/182 |
| 5,850,229 | A * | 12/1998 | Edelsbrunner et al. | 345/473 |
| 5,929,860 | A * | 7/1999 | Hoppe | 345/419 |
| 5,966,141 | A * | 10/1999 | Ito et al. | 345/473 |
| 6,037,949 | A * | 3/2000 | DeRose et al. | 345/582 |
| 6,130,673 | A * | 10/2000 | Pulli et al. | 345/428 |
| 6,133,922 | A * | 10/2000 | Opitz | 345/420 |
| 6,181,978 | B1 * | 1/2001 | Hinds et al. | 700/182 |
| 6,208,939 | B1 * | 3/2001 | Kunii | 702/5 |
| 6,236,403 | B1 * | 5/2001 | Chaki et al. | 345/420 |
| 6,256,039 | B1 * | 7/2001 | Krishnamurthy | 345/420 |
| 6,271,856 | B1 * | 8/2001 | Krishnamurthy | 345/581 |
| 6,271,861 | B1 * | 8/2001 | Sargent et al. | 345/589 |
| 6,298,156 | B1 * | 10/2001 | Ishida et al. | 382/197 |
| 6,313,837 | B1 * | 11/2001 | Assa et al. | 345/420 |
| 6,323,863 | B1 * | 11/2001 | Shinagawa et al. | 345/441 |
| 6,377,865 | B1 * | 4/2002 | Edelsbrunner et al. | 700/98 |
| 6,385,332 | B1 * | 5/2002 | Zahalka et al. | 382/128 |
| 6,466,892 | B2 * | 10/2002 | Fujii et al. | 702/150 |
| 6,525,725 | B1 * | 2/2003 | Deering | 345/419 |
| 6,603,473 | B1 * | 8/2003 | Litke et al. | 345/420 |

(Continued)

OTHER PUBLICATIONS

Shepherd et al.; Methods for Multisweep Automation; Sep. 14, 2000; 9th International Meshing Roundtable; pp. 1-11.*

(Continued)

*Primary Examiner* — Xiao Wu
*Assistant Examiner* — David T Welch
(74) *Attorney, Agent, or Firm* — Myers Bigel Sibley & Sajovec

(57) ABSTRACT

Methods of modeling a three-dimensional surface structure include partitioning three-dimensional object data into regions of a Morse complex and generating a feature skeleton having a plurality of smooth edges and a plurality of vertices separating the regions of the Morse complex. Operations are also performed to thicken the feature skeleton by replacing the plurality of smooth edges with corresponding pairs of curves that locate longitudinal boundaries of transitions between primary regions of the feature skeleton. The thickening operations may also include replacing each of the plurality of vertices with a corresponding loop of edges, using setback-type vertex blends.

14 Claims, 27 Drawing Sheets

U.S. PATENT DOCUMENTS

| | | | | |
|---|---|---|---|---|
| 6,674,430 B1* | 1/2004 | Kaufman et al. | ............. | 345/419 |
| 6,853,373 B2 | 2/2005 | Williams et al. | | |
| 6,996,505 B1 | 2/2006 | Edelsbrunner et al. | | |
| 7,023,432 B2 | 4/2006 | Fletcher et al. | | |
| 2001/0013866 A1* | 8/2001 | Migdal et al. | ................ | 345/423 |
| 2003/0016874 A1* | 1/2003 | Lefler et al. | ................... | 382/229 |
| 2003/0020710 A1* | 1/2003 | Biermann et al. | ............ | 345/420 |
| 2005/0002571 A1* | 1/2005 | Hiraga et al. | ................ | 382/218 |

OTHER PUBLICATIONS

Ni et al.; Fair Morse Functions for Extracting the Topological Structure of a Surface Mesh; Aug. 2004; ACM; vol. 23, Issue 3; pp. 613-622.*

Knupp; Winslow Smoothing on Two-Dimensional Unstructured Meshes; Sep. 13, 1999; Springer London; vol. 15, No. 3; pp. 263-268.*

Hoppe et al.; Piecewise Smooth Surface Reconstruction; 1994; ACM; Proceeding of the 21st Annual International Conference on Computer Graphics and Interactive Techniques; pp. 295-302.*

Agarwal et al. "Extreme Elevation on a 2-Manifold" *Proc. 20th Ann. Sympos. Comput. Geom.* 357-365 (2004).

Benkö et al. "Algorithms for Reverse Engineering Boundary Representation Models" *Computer-Aided Design* 36:511-523 (2004).

Benkö et al. "Segmentation methods for smooth point regions of conventional engineering objects" *Computer-Aided Design* 36:511-523 (2004).

Braid et al. "Non-local blending of boundary models" *Computer-Aided Design* 29(2):89-100 (1997).

Bremer et al. "Topological Hierarchy for Functions on Triangulated Surfaces" *Proc. Ann. IEEE Conf. Visualization* 139-146 (2003).

Bremer et al. "A Multi-resolution Data Structure for Two-dimensional Morse-Smale Functions" *Proc. Ann. IEEE Conf. Visualization* 139-146 (2003).

Eck et al. "Automatic Reconstruction of B-Spline Surfaces of Arbitrary Topological Type" *Comput. Graphics Proc., SIGGRAPH* 325-334 (1996).

Edelsbrunner et al. "Topological Persistence and Simplification" *Discrete Comput. Geom.* 28:511-513 (2002).

Edelsbrunner et al. "Hierarchical Morse-Smale Complexes for Piecewise Linear 2-Manifolds" *Discrete Comput Geom* 30:87-107 (2003).

Edelsbrunner "Surface Tiling with Differential Topology" *Eurographics Symposium on Geometry Processing* (2005)—Abstract only.

Fitzgibbon et al. "High-level CAD Model Acquisition from Range Images" *Computer-Aided Design* 29(4):321-330 (1997).

Floater et al. "Parametrization and smooth approximation of surface triangulations" *Computer Aided Geometric Design* 14:231-250 (1997).

Forman et al. "Combinatorial Differential Topology and Geometry" *MSRI Publication* 8:177-206 (1999).

Frisken et al. "Adaptively Sampled Distance Fields: A General Representation of Shape for Computer Graphics" *Mitsubishi Electric Research Laboratories, Cambridge Research Center, SIGGRAPH* 249-254 (2000).

Fu, Ping "SBIR Phase II: Automatic Creation of NURBS Patches from Triangulated Surfaces" *National Science Foundation*—(2 pages) (2002) Award Abstract only.

Heckbert et al. "Survey of Polygonal Surface Simplification Algorithms" *Multiresolution Surface Modeling Course, Proc. SIGGRAPH* 1-29 (1997).

Kos et al. "Methods to recover constant radius rolling ball blends in reverse engineering" *Computer Aided Geometric Design* 17:127-160 (2000).

Lee et al. "MAPS: Multiresolution Adaptive Parameterization of Surfaces" *Comput. Graphics, Proc., SIGGRAPH* 95-104 (1998).

Leonardis et al. "Superquadrics for Segmenting and Modeling Range Data" *IEEE Transactions on Pattern Analysis and Machine Intelligence* 19(11):1289-1295 (1997).

Mangan et al. "Partitioning 3D Surface Meshes Using Watershed Segmentation" *IEEE Transactions on Visualization and Computer Graphics* 5(4):308-321 (1999).

Sapidis et al. "Direct Construction of Polynomial Surfaces from Dense Range Images through Region Growing" *ACM Transactions on Graphics* 14(2):171-200 (1995).

Varady et al. "Geometric construction for setback vertex blending" *Computer-Aided Design* 29(6):413-425 (1997).

Vida et al. "A survey of blending methods that use parametric surfaces" *Computer-Aided Design* 26(5):341-365 (1994).

Varady et al., "Automatic Extraction of Surface Structures in Digital Shape Reconstruction," GMP 2006, LNCS 4077, pp. 1-16, 2006.

Varady et al., "Automatic Extraction of Surface Structures in Digital Shape Reconstruction," Computer-Aided Design 39 (2007) pp. 379-388.

Edelsbrunner, Herbert, "Surface Tiling with Differential Topology," Symposium on Geometry Processing, Vienna, Austria, Jul. 4-6, 2005, Abstract Only.

* cited by examiner

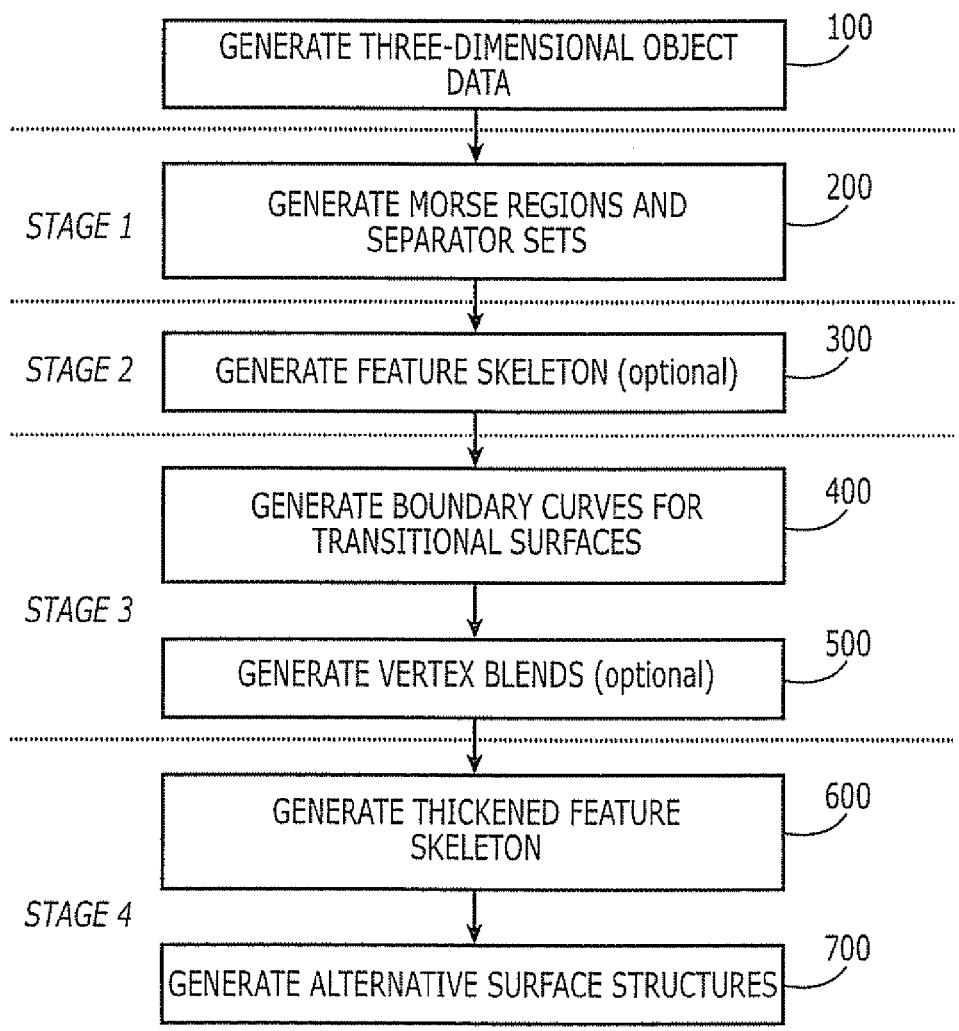
FIG. 1.1

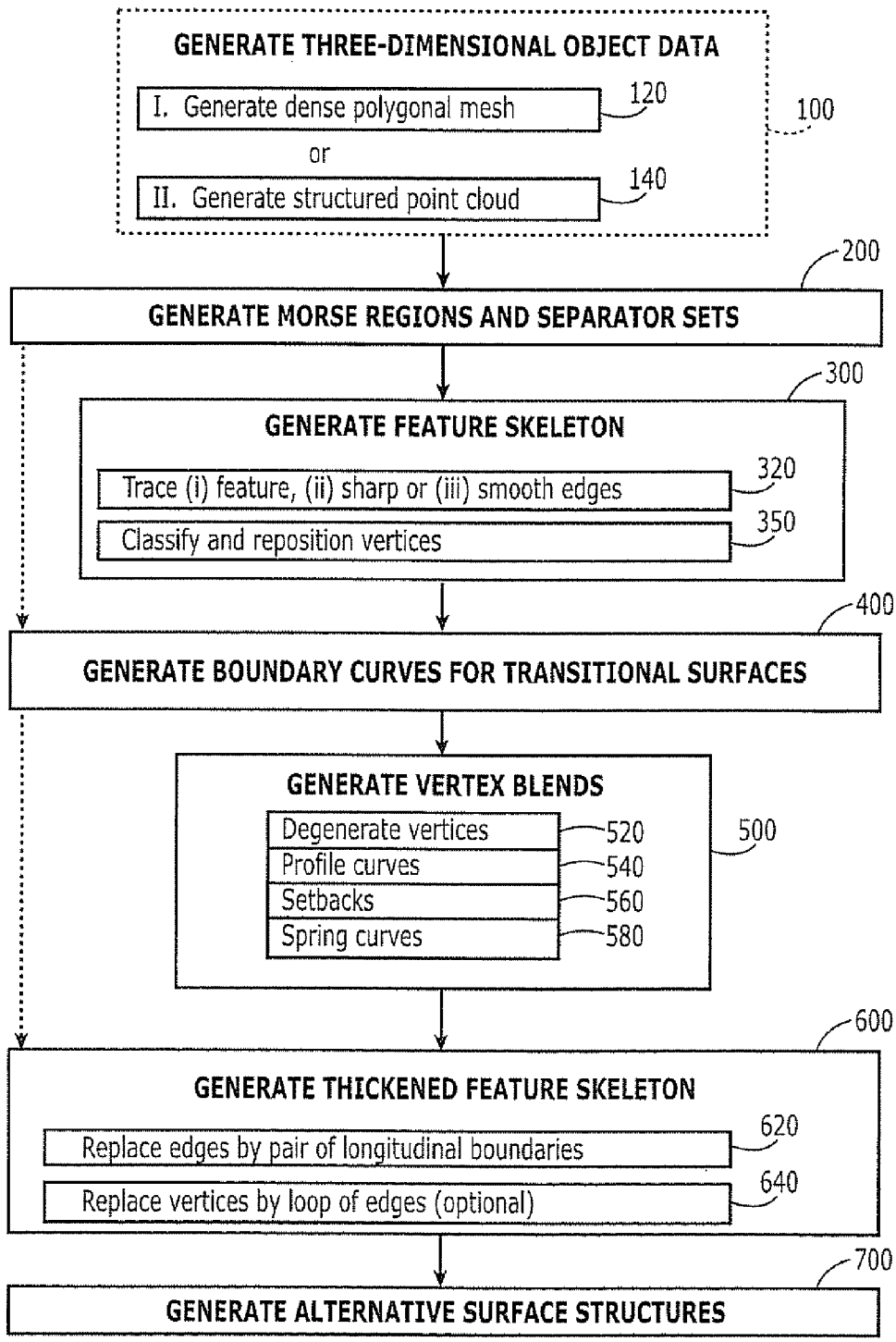
FIG. 1.2

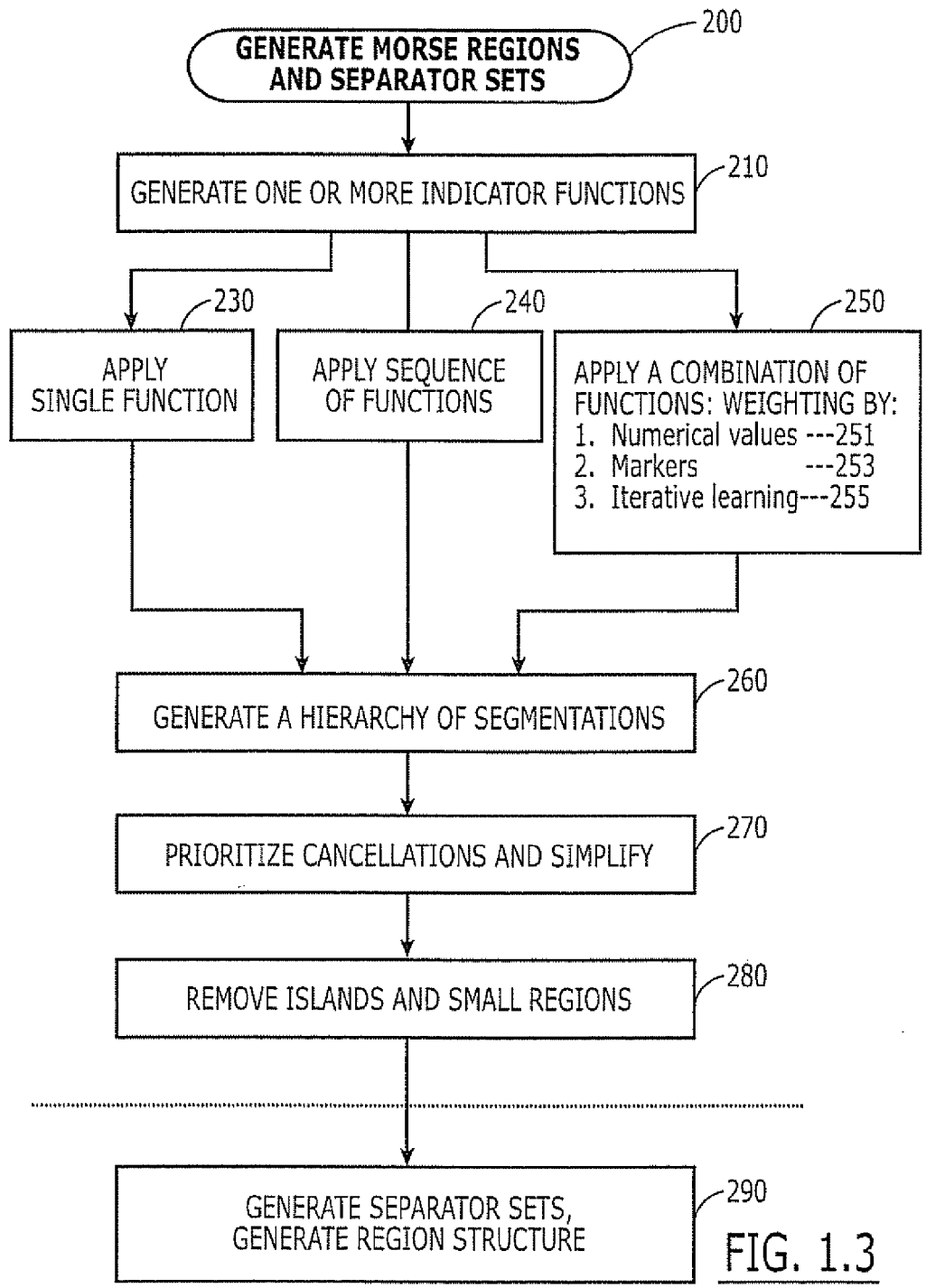
FIG. 1.3

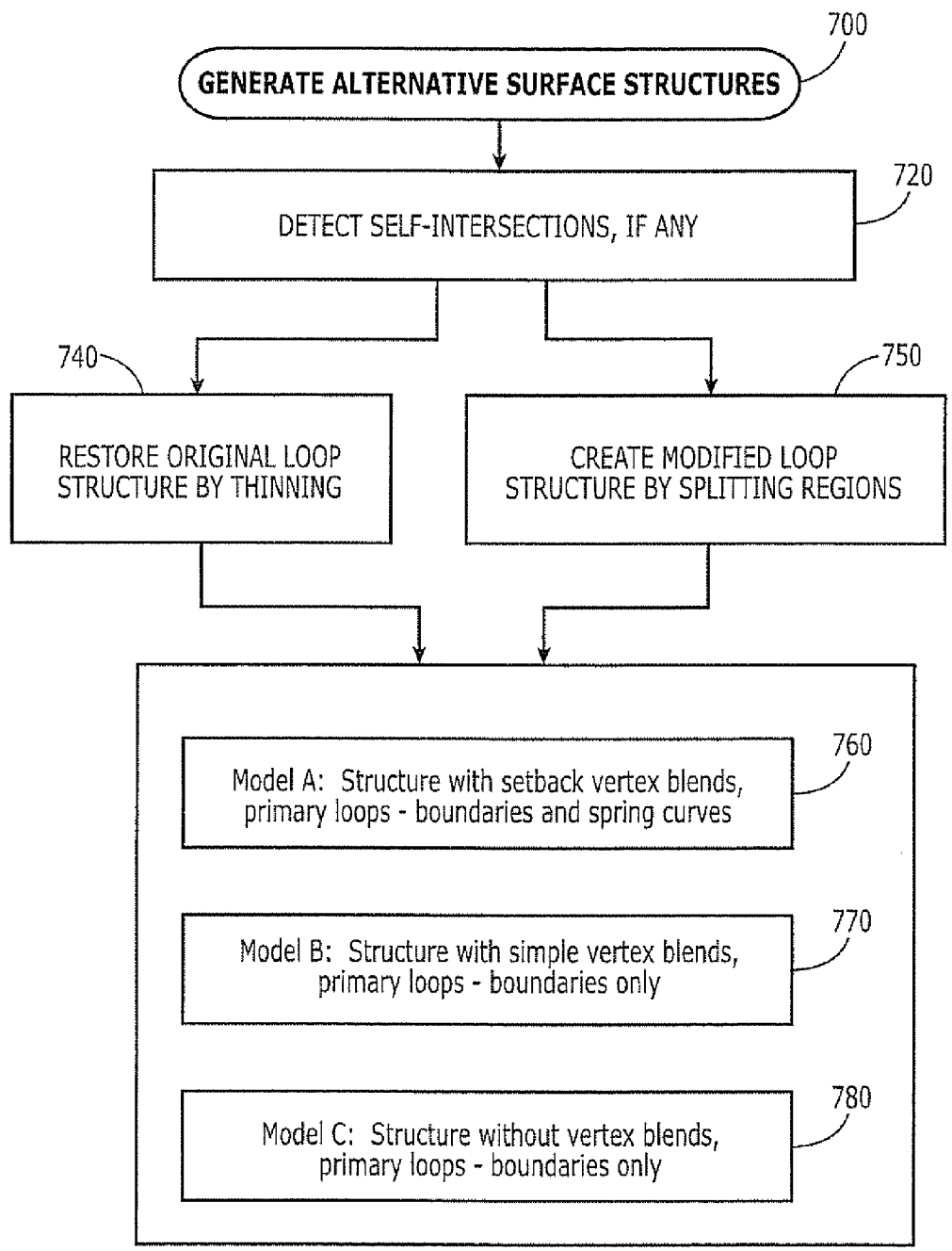
FIG. 1.4

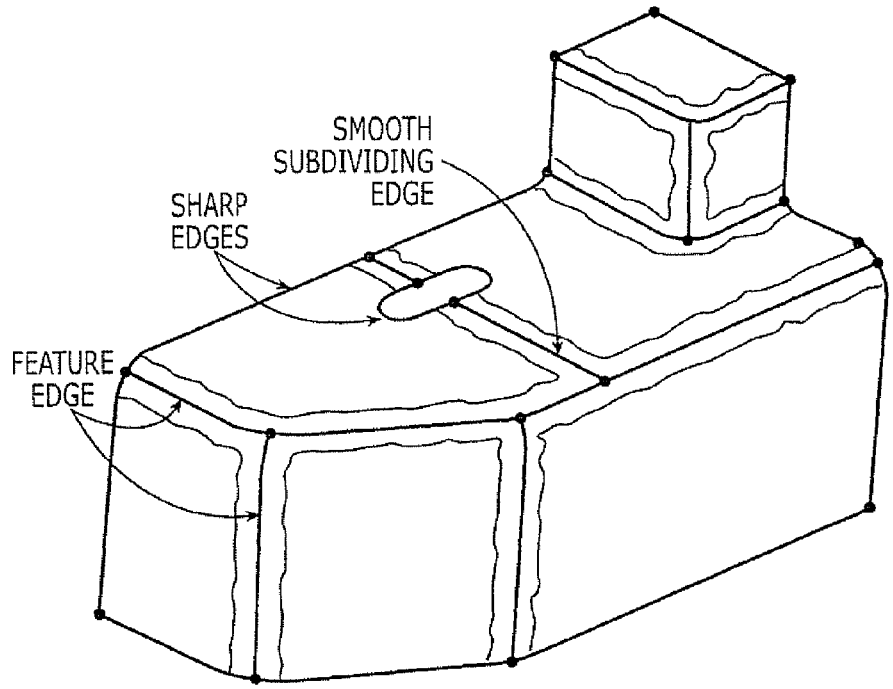
FIG. 1.5
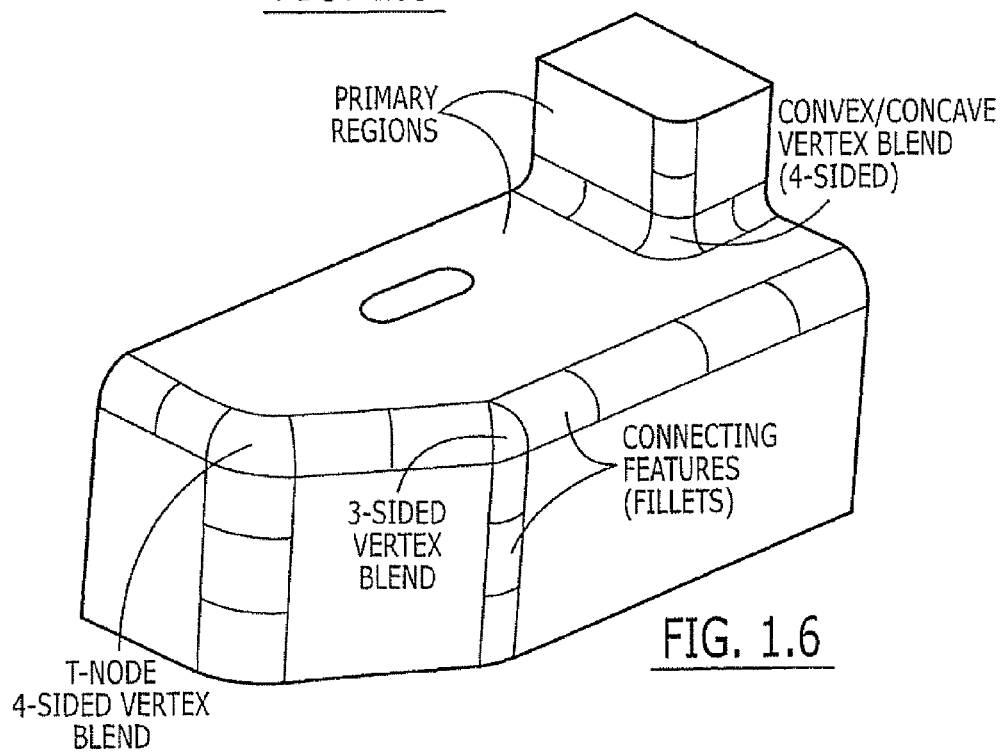
FIG. 1.6

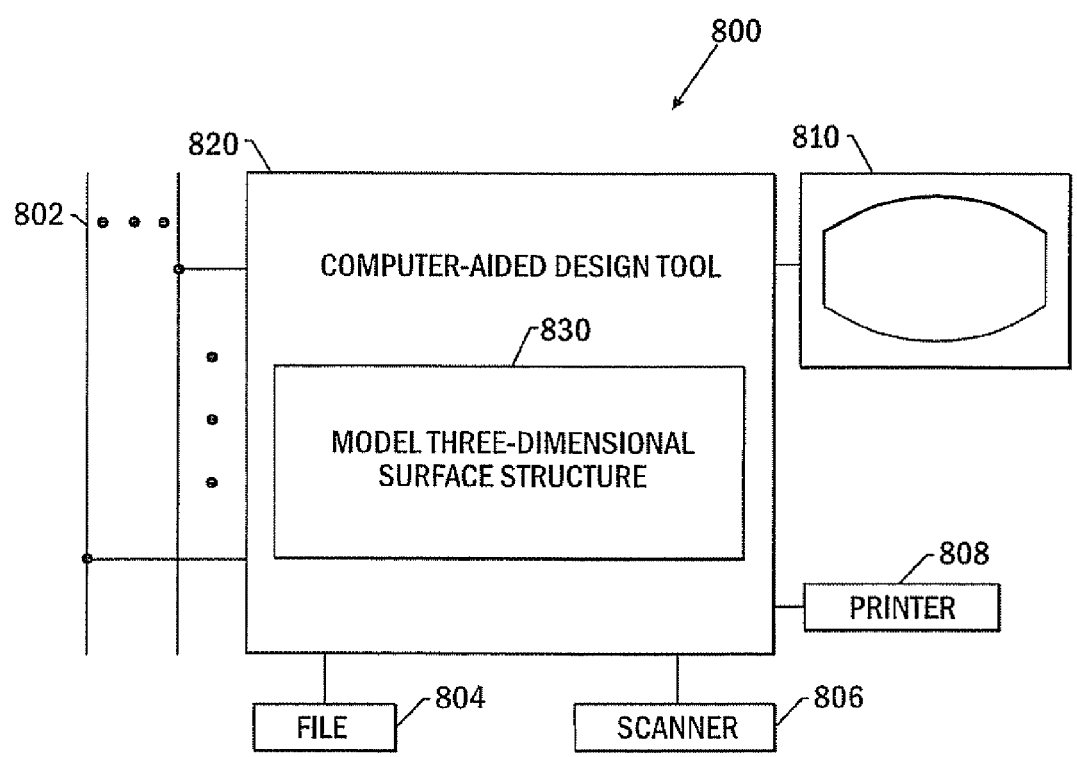
FIG. 1.7

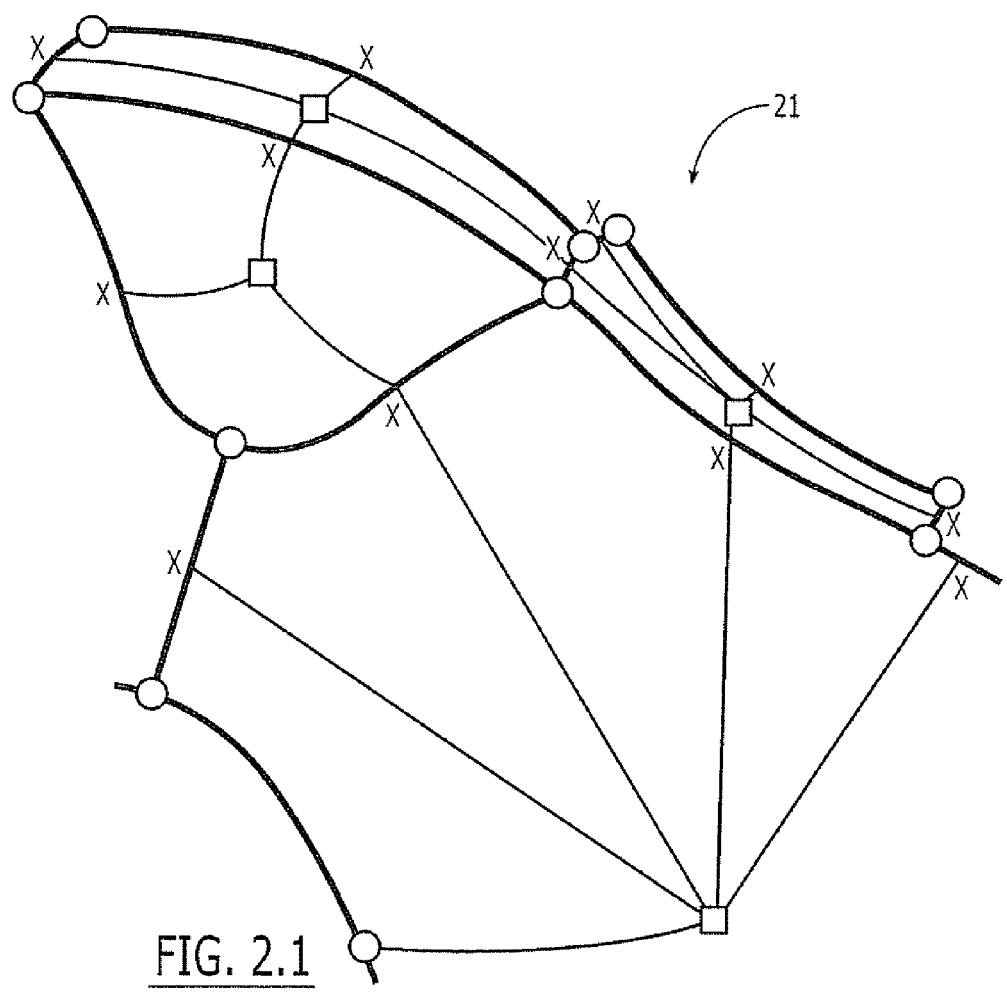
FIG. 2.1

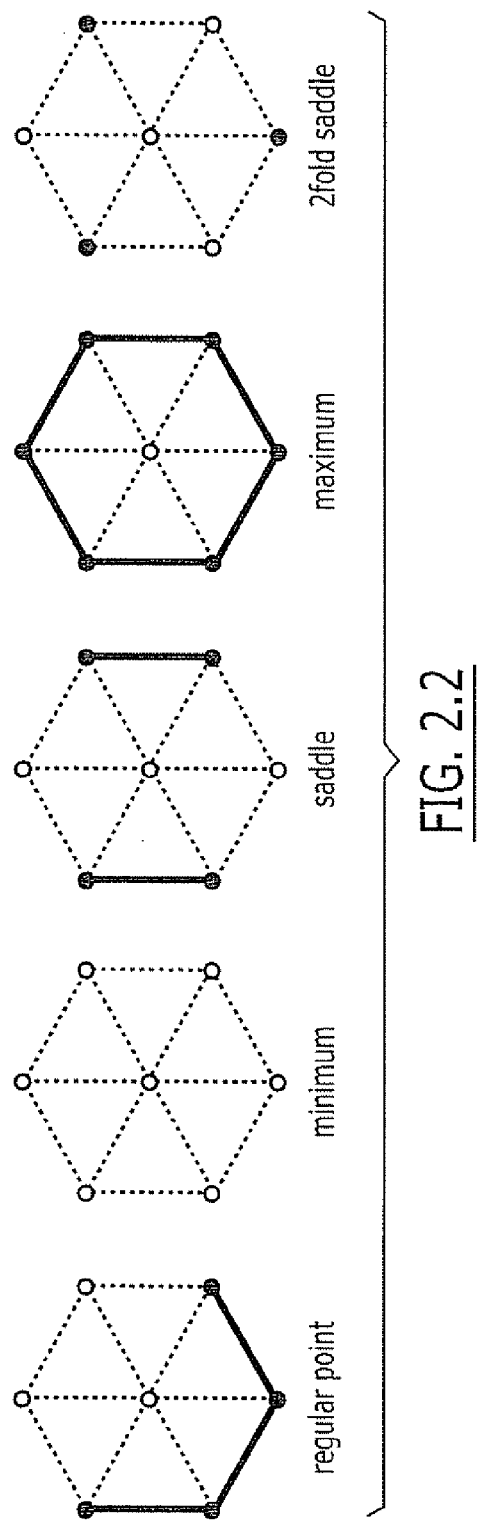
FIG. 2.2

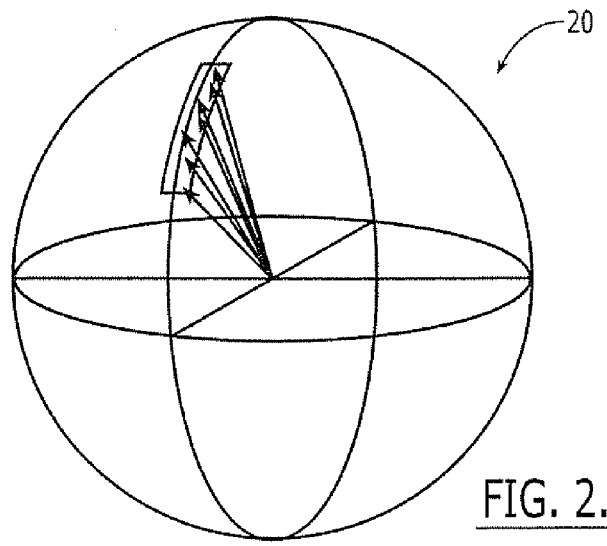
FIG. 2.3
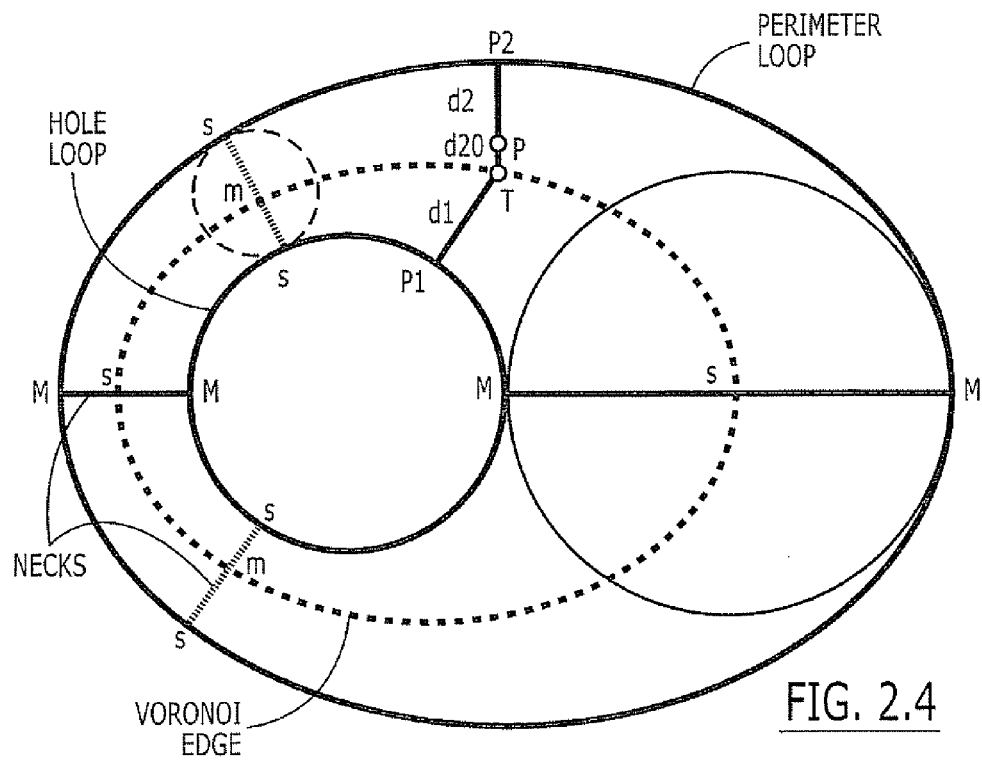
FIG. 2.4

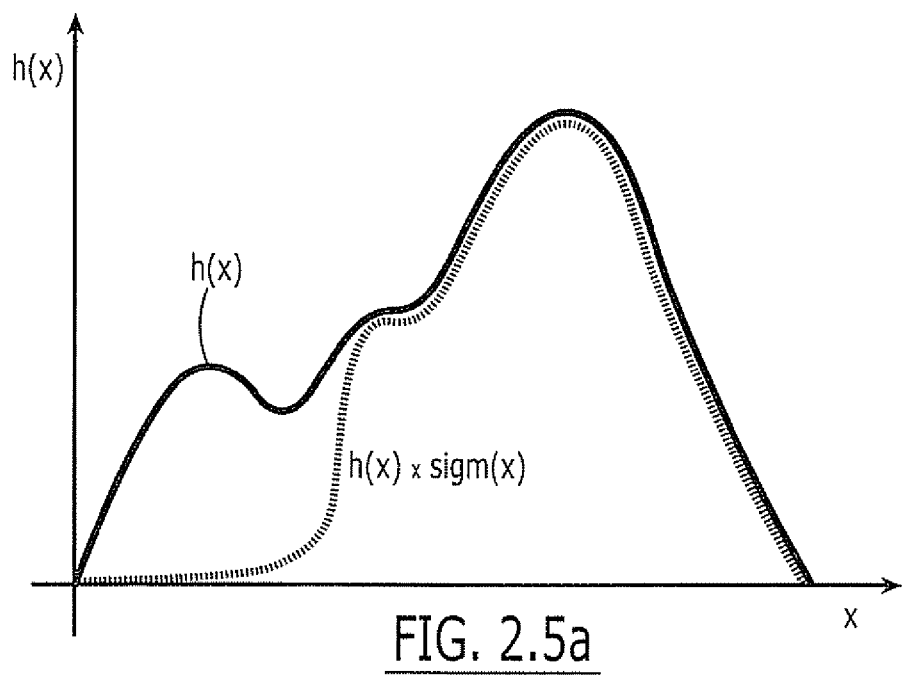
FIG. 2.5a
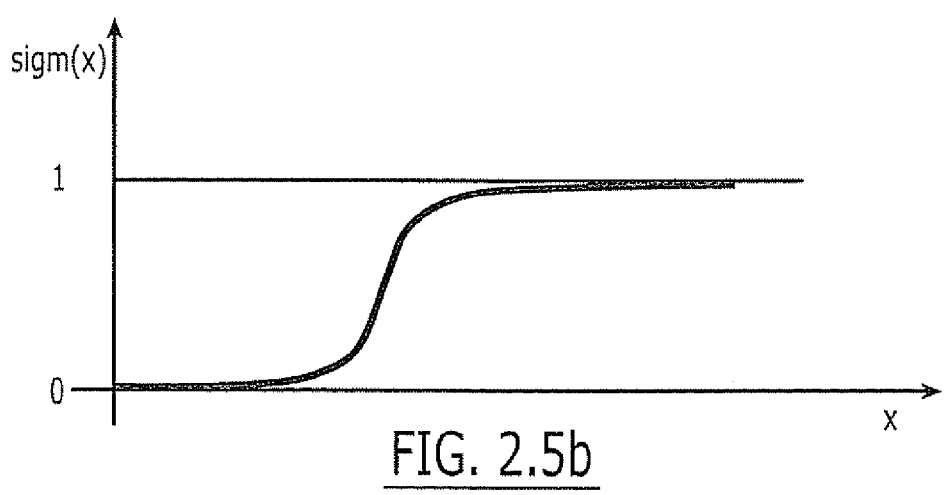
FIG. 2.5b

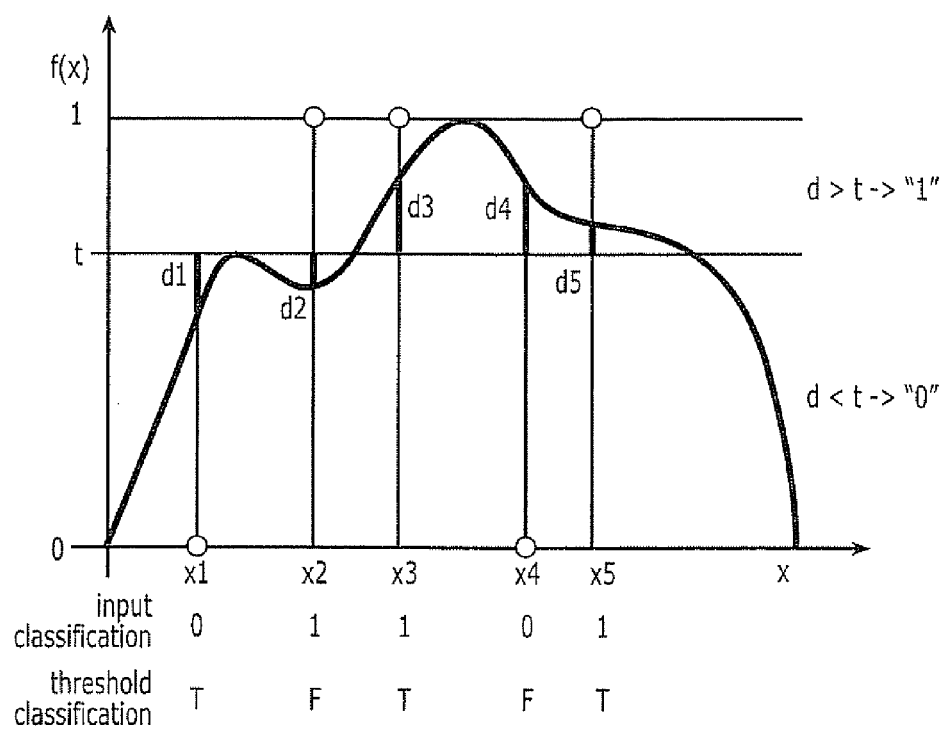
FIG. 2.6

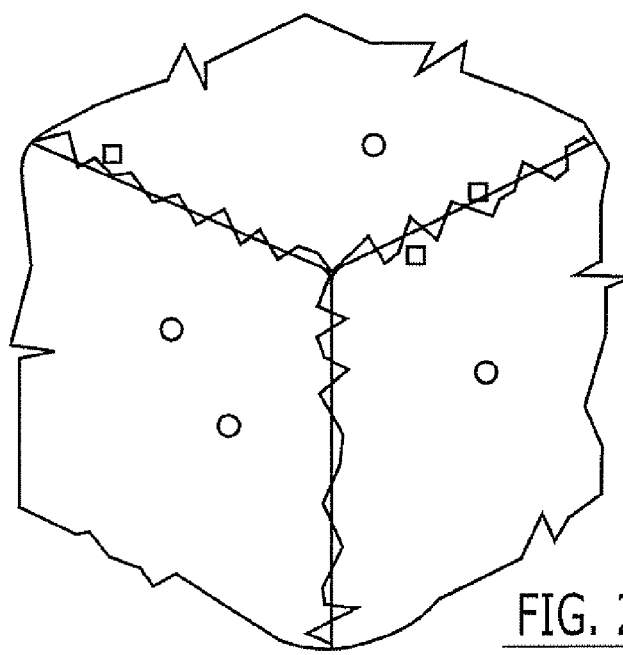
FIG. 2.7a
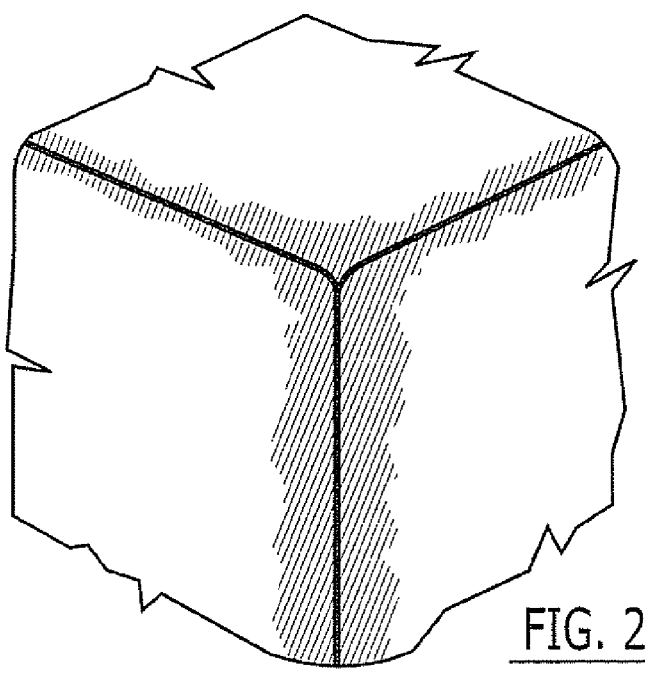
FIG. 2.7b

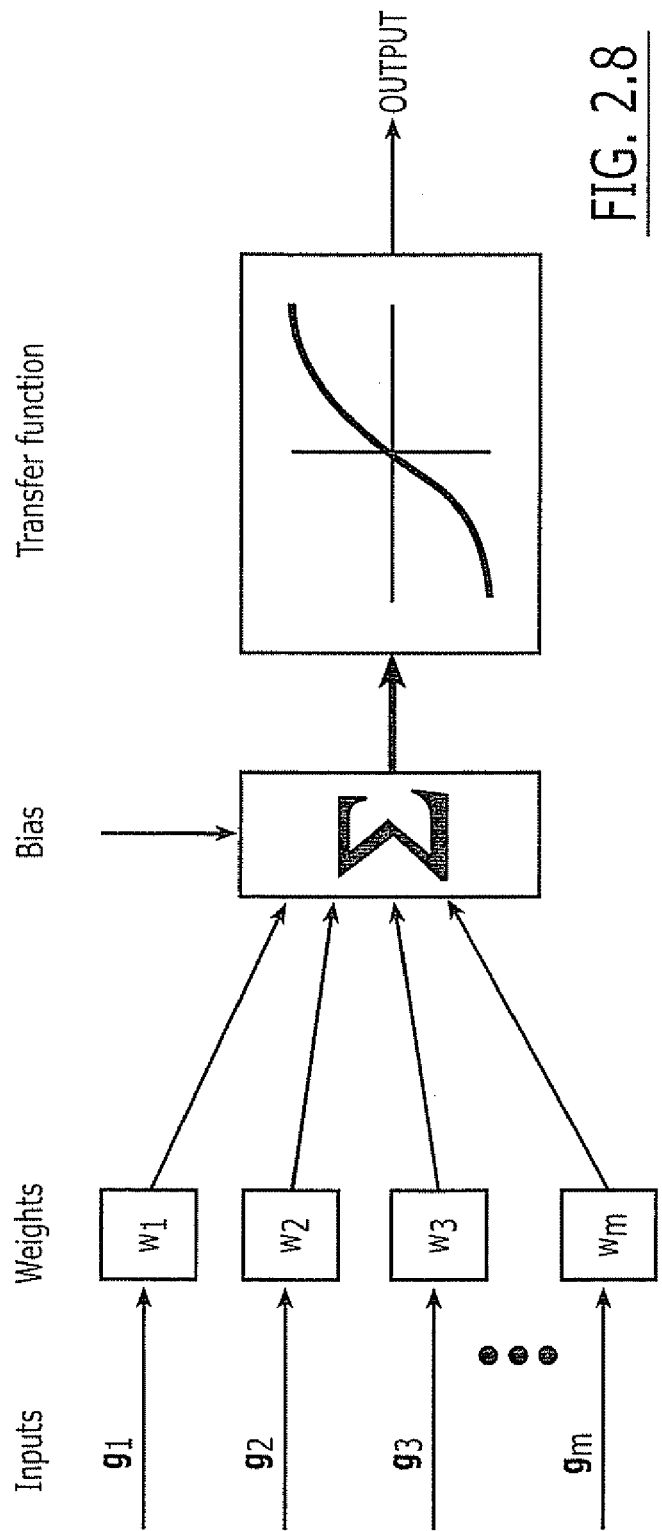
FIG. 2.8

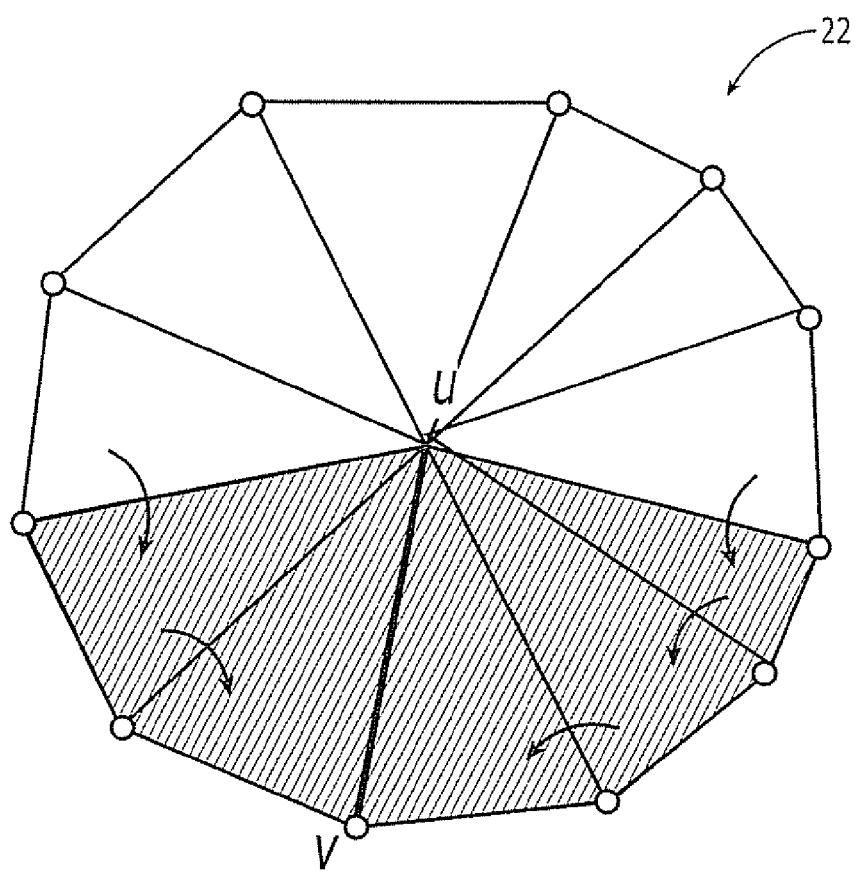
FIG. 2.9

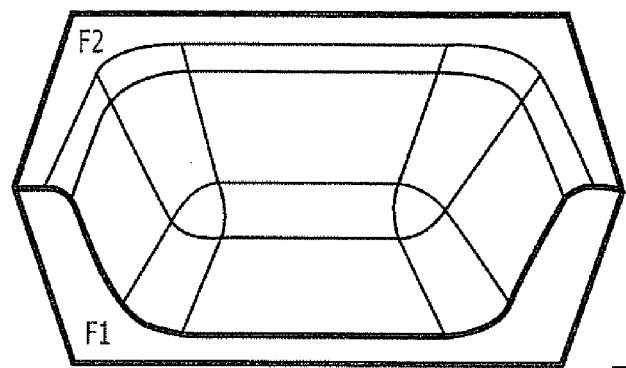
FIG. 2.10a
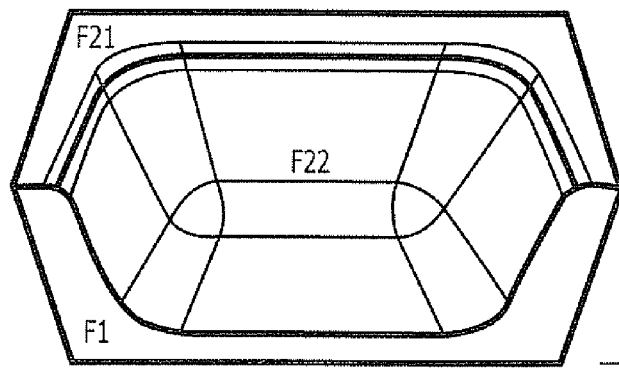
FIG. 2.10b
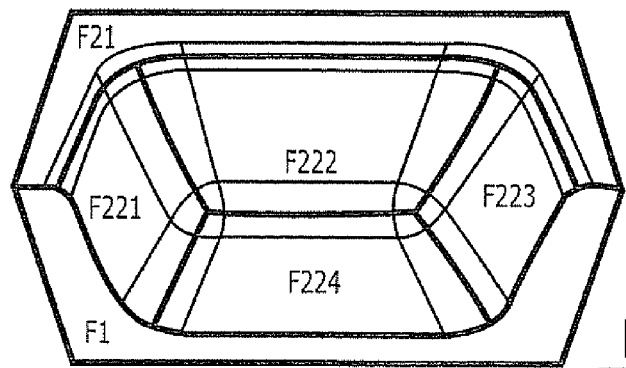
FIG. 2.10c

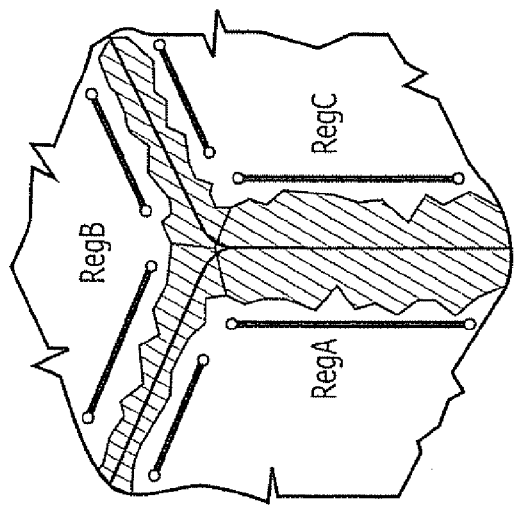
FIG. 3.1c
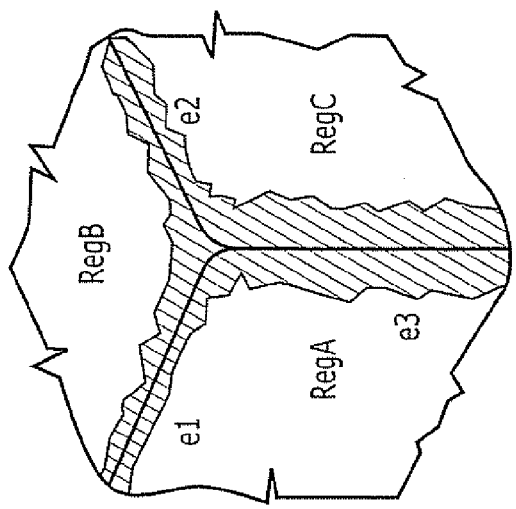
FIG. 3.1b
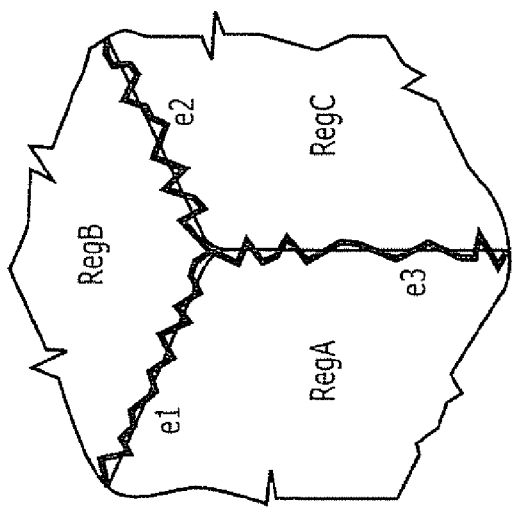
FIG. 3.1a

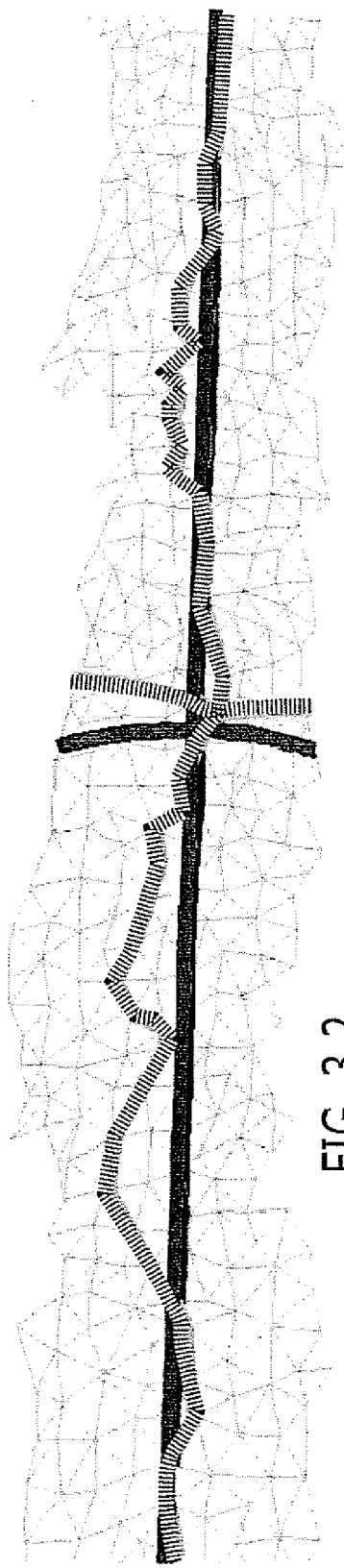
FIG. 3.2

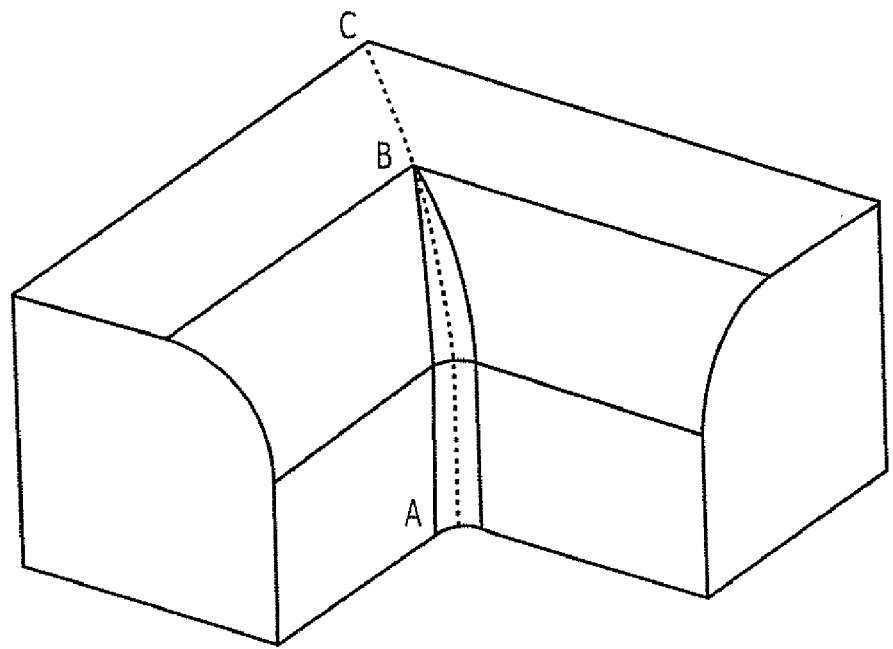
FIG. 3.3
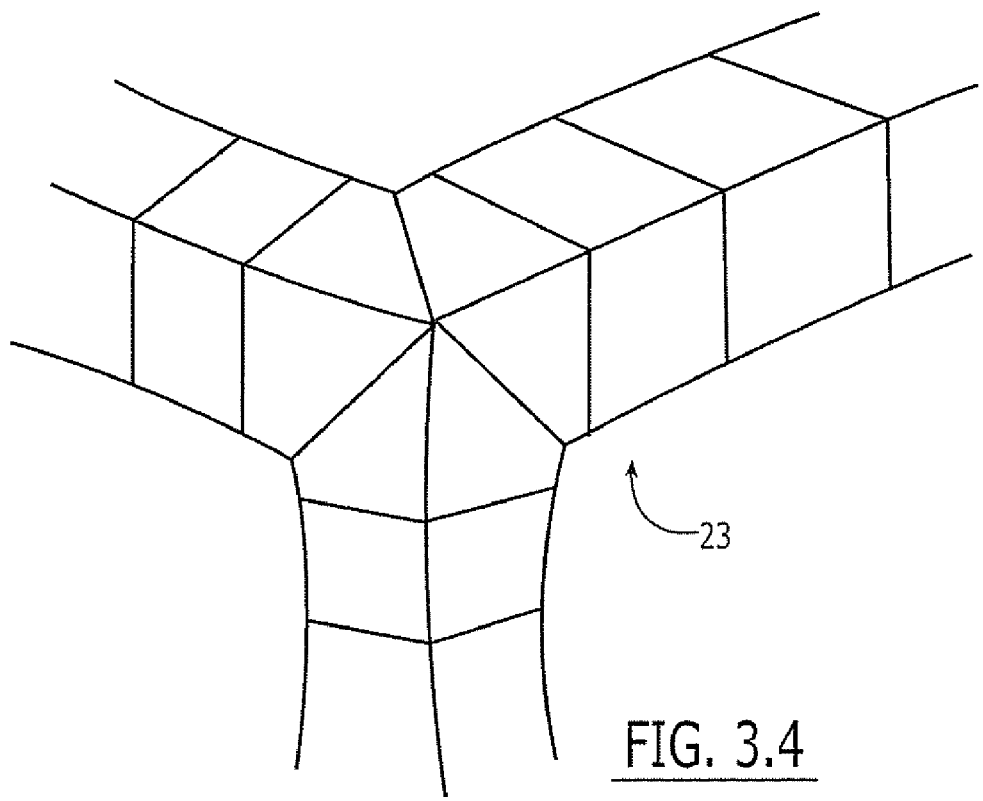
FIG. 3.4

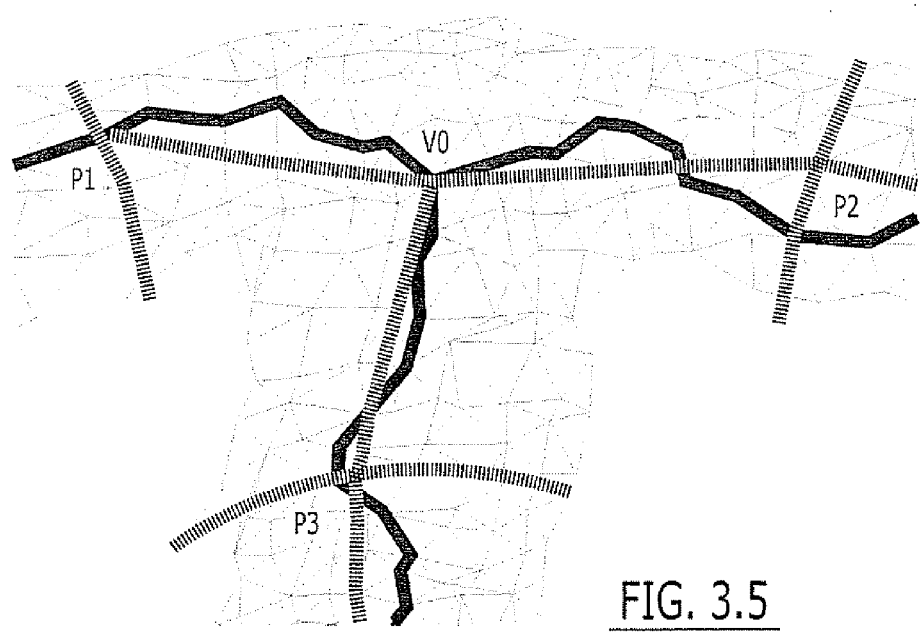
FIG. 3.5

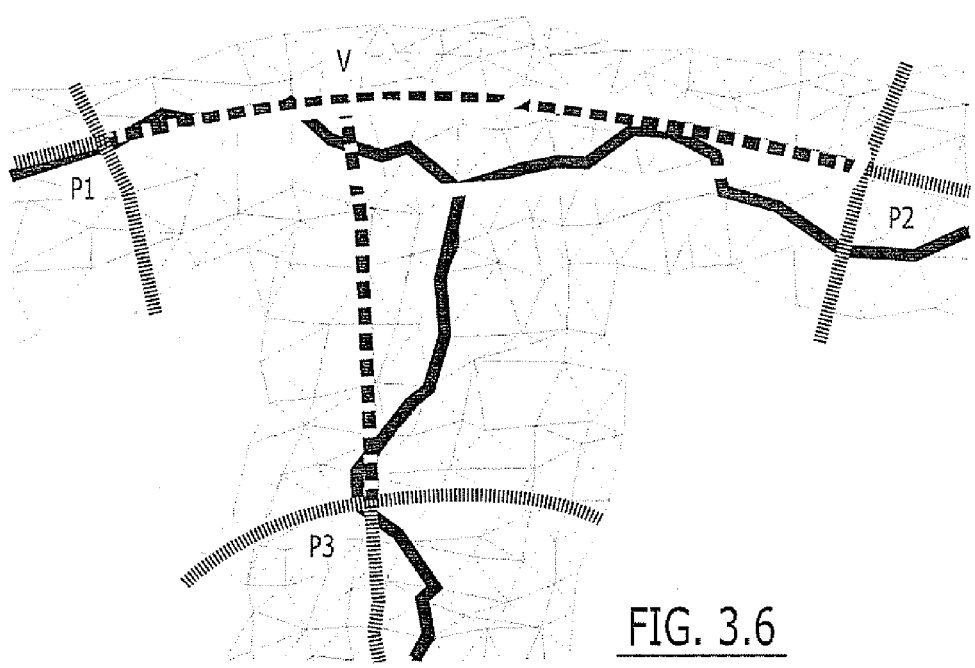
FIG. 3.6

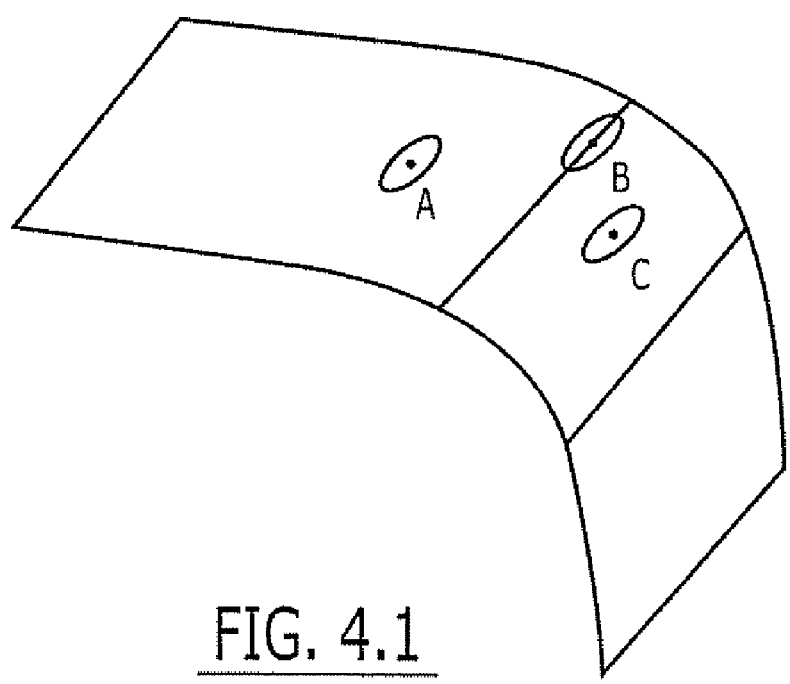
FIG. 4.1

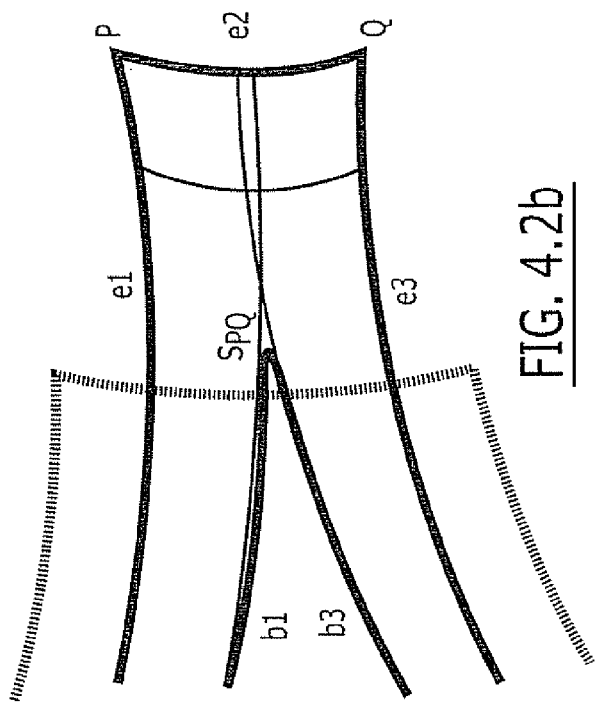
FIG. 4.2b
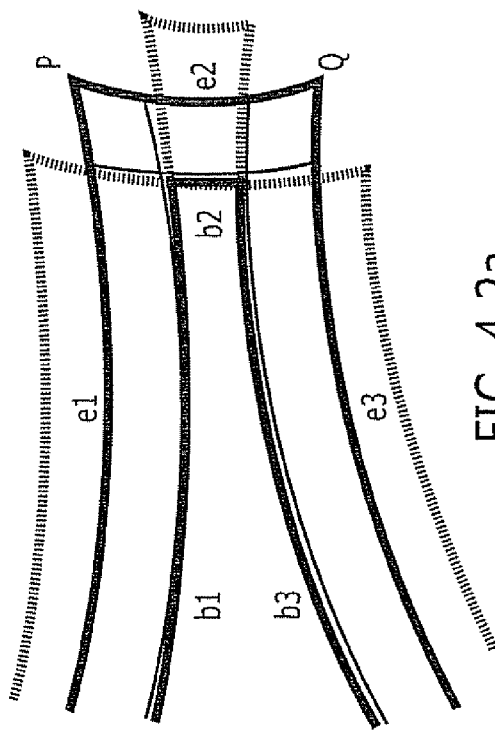
FIG. 4.2a

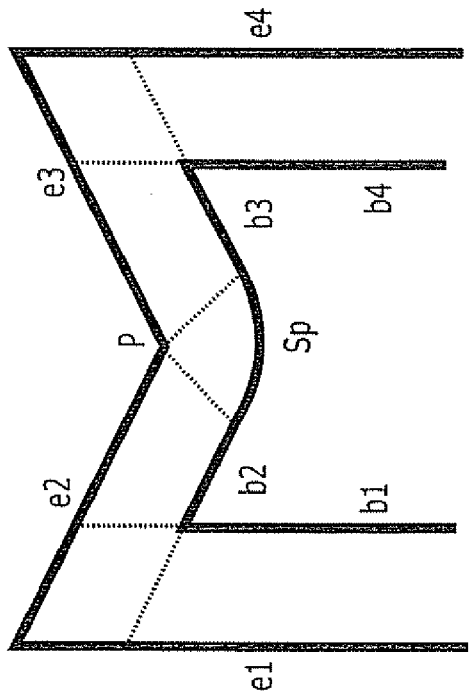
FIG. 4.3b
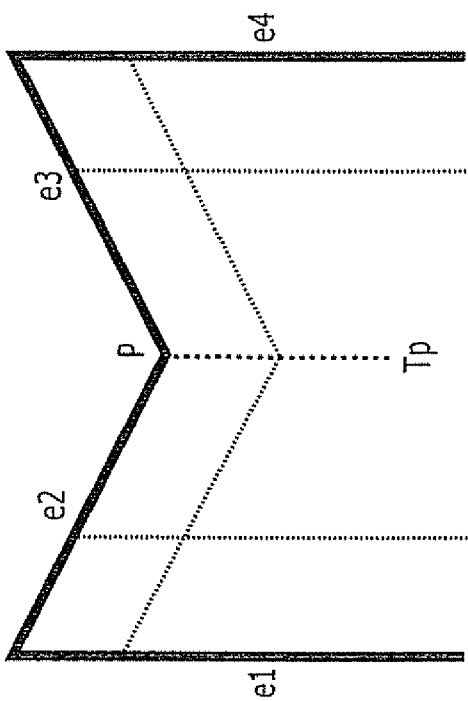
FIG. 4.3a

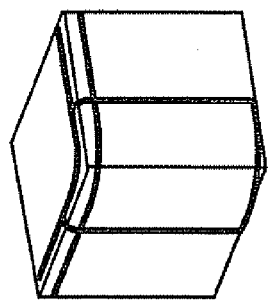
FIG. 4.4g
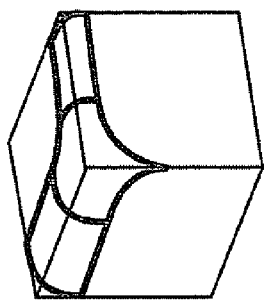
FIG. 4.4h
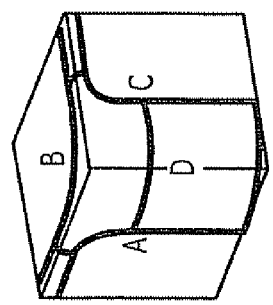
FIG. 4.4e
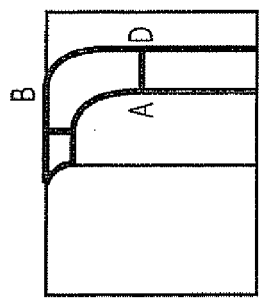
FIG. 4.4f
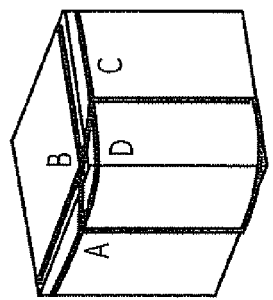
FIG. 4.4c
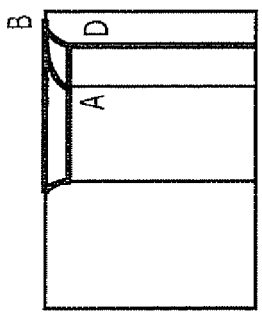
FIG. 4.4d
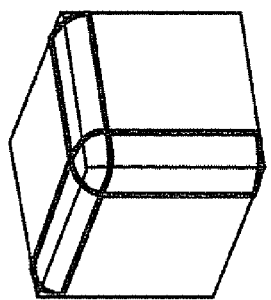
FIG. 4.4a
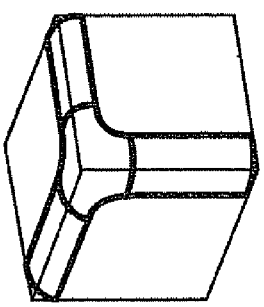
FIG. 4.4b

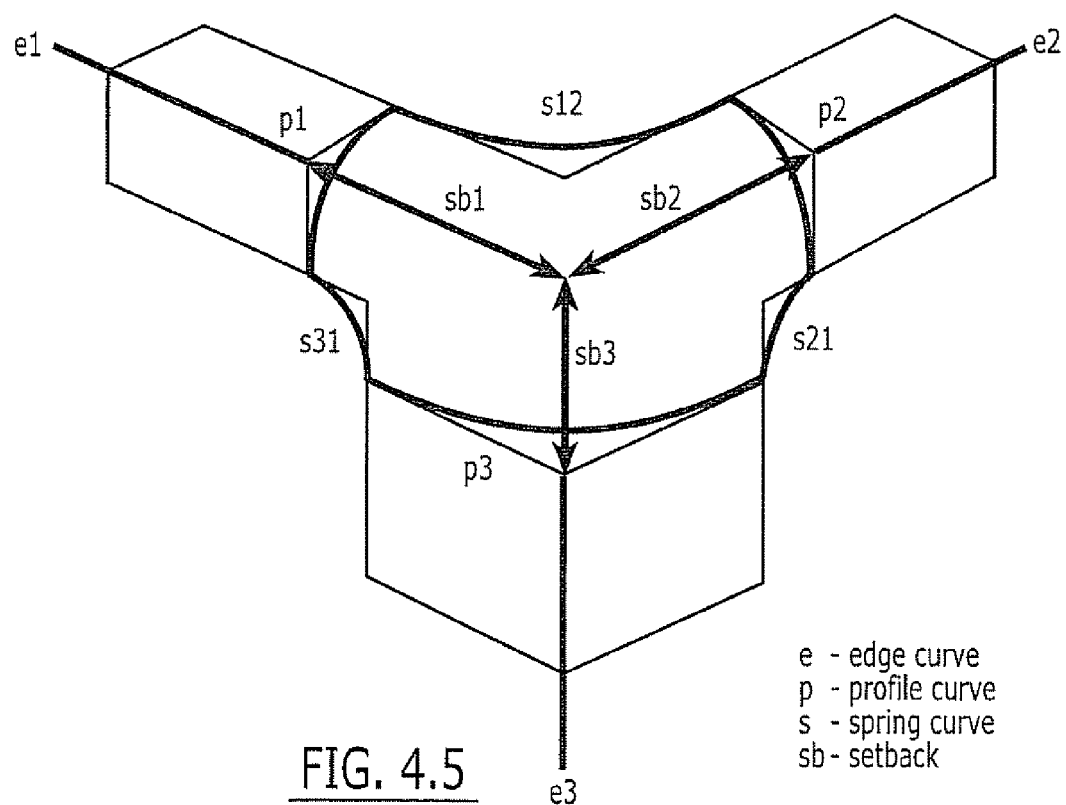
FIG. 4.5
e - edge curve
p - profile curve
s - spring curve
sb - setback

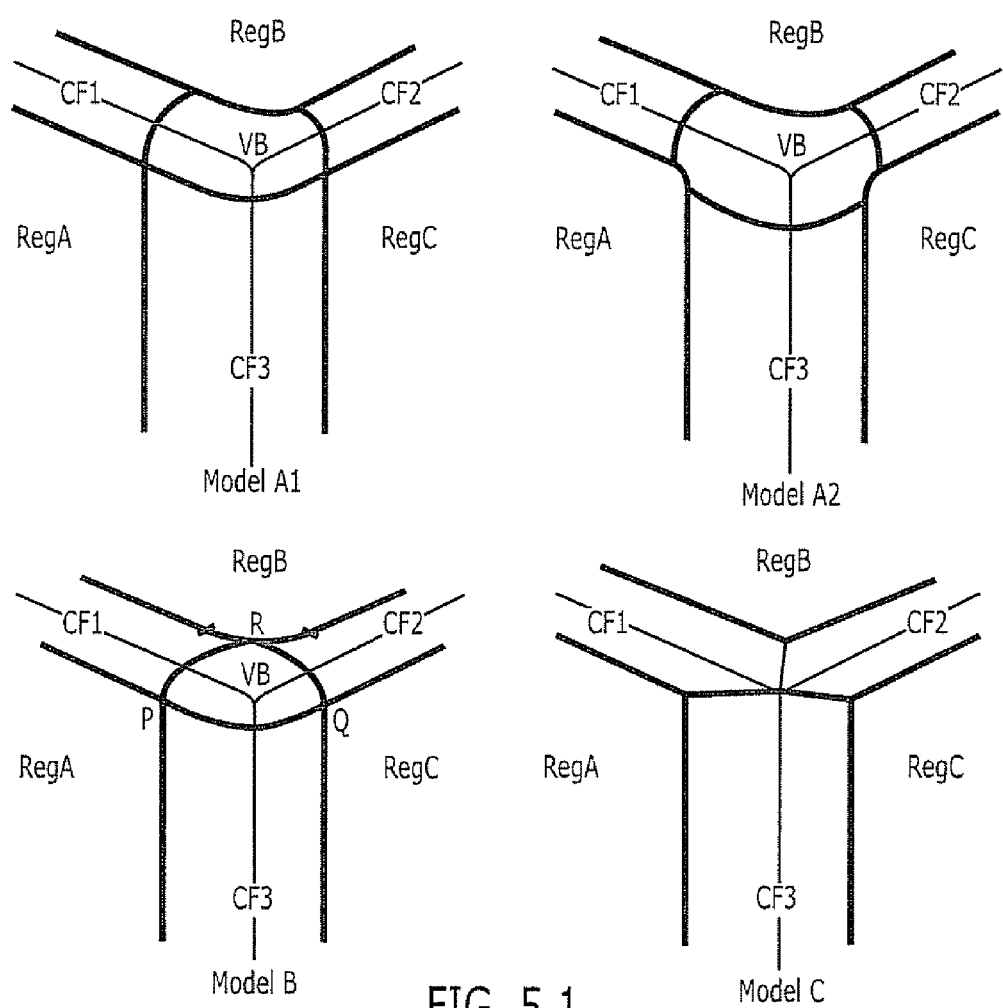
FIG. 5.1

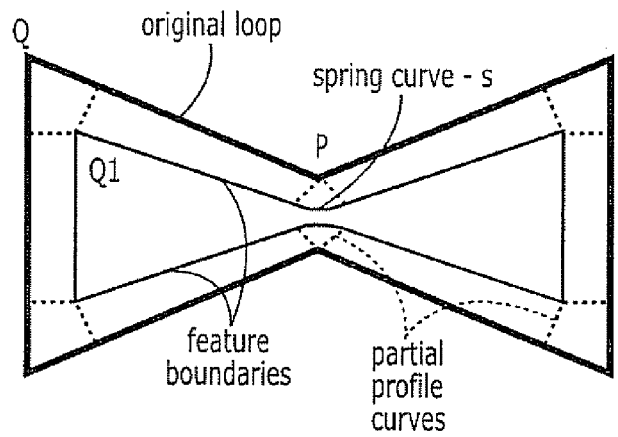
FIG. 5.2a
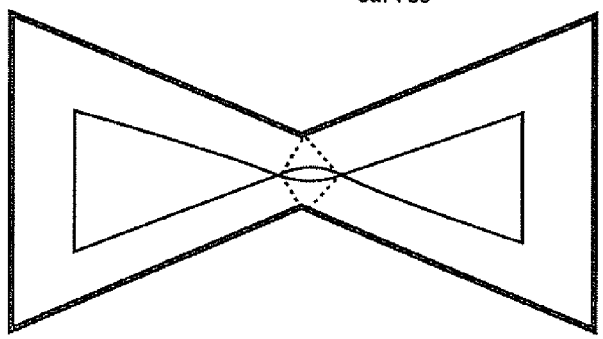
FIG. 5.2b
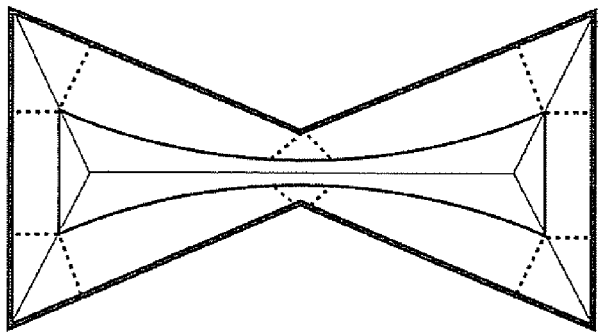
FIG. 5.2c
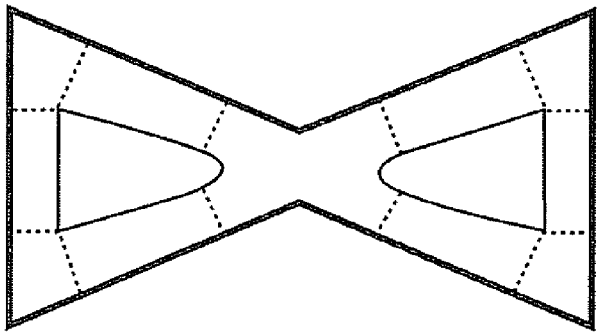
FIG. 5.2d

METHODS, APPARATUS AND COMPUTER PROGRAM PRODUCTS THAT MODEL THREE-DIMENSIONAL SURFACE STRUCTURES

REFERENCE TO PRIORITY APPLICATION

This application claims priority to U.S. Provisional Application Ser. Nos. 60/694,123, filed Jun. 24, 2005 and 60/747,118, filed May 12, 2006, the disclosures of which are hereby incorporated herein by reference.

FIELD OF THE INVENTION

This invention relates to methods and systems that model three-dimensional (3D) surfaces and, more particularly, to methods and systems that reconstruct surface structures of 3D objects from data point sets.

BACKGROUND OF THE INVENTION

Digital shape reconstruction is a field that focuses on converting physical objects into digital representations. Various 3D scanning technologies are available that collect sample data points on a surface of a physical object, and well-established techniques exist to convert the data points into dense or decimated polygonal meshes, which need to be further converted into representations suitable for CAD, CAM, and CAE. A challenge in this field is to automate the conversion process while producing digital models that meet the requirements of downstream applications, including both an accurate representation of the features of the models and a high degree of smoothness. The first step to reach this goal is to partition three-dimensional object data, including point clouds and related polygonal meshes into appropriate regions. A so-called segmenting curve network is also created that determines the boundary curves of these regions. Regions are pre-images of the faces of a final CAD model, and, in a later phase of digital shape reconstruction, each region may be approximated by a single or composite surface.

Techniques for generating digital models may utilize results from Combinatorial Morse Theory. One aspect of this theory is the analysis of functions defined over manifolds, represented as polygonal meshes produced from point clouds. Each function is assumed to be piecewise linear, approximating an unknown smooth function. To analyze this function means identifying its main features, which are defined in terms of critical points and connections between them. For surfaces (2 manifolds) there are only three types of non-degenerate critical points: minima, saddles, and maxima. The Morse complex draws curves between the saddles and the minima, forming a curve network that decomposes the surface into simple monotonic regions, one for each maximum. This theory can be utilized to construct a natural region structure that adapts to the features of the object.

In Computer Aided Design (CAD) and, in particular, in mechanical engineering, objects are composed of (i) relatively large, functional surfaces connected by (ii) highly-curved transitions, which are often called connecting features, and (iii) vertex blends at their junctions. A CAD model is a collection of stitched faces that lie on various types of implicit, parametric and special surfaces. The related representational and algorithmic issues associated with CAD model generation have been deeply studied in the computer aided geometric design literature. The goal of digital shape reconstruction is to find a faithful and geometrically well-aligned region structure, which corresponds to the above surface hierarchy and makes it possible to approximate regions by using standard CAD surfaces.

The term "segmentation" is frequently used in the digital shape reconstruction literature, but this needs to be distinguished from segmentation techniques applied in image processing, where mostly bitmaps and concise visual information are the focus. Triangulated 2-manifolds have been studied in the field of computer graphics and geometric processing. There have also been efforts to construct feature-adapting quadrangulations using Voronoi diagrams or exploit geometric information accumulated by surface decimation algorithms. Conventional techniques to reconstruct surface structures include "region growing" methods. Similar techniques also exist for segmenting range images. Another group of solutions deals with a limited class of objects that can be bounded only by simple surfaces.

SUMMARY OF THE INVENTION

Embodiments of the invention include computer-implemented methods of modeling three-dimensional surface structures, and computer-program products and apparatus configured to perform the methods described herein. These methods include partitioning point data (e.g., a polygonal mesh or a point cloud) of a three-dimensional object into regions of a Morse complex and generating a feature skeleton having a plurality of smooth edges and a plurality of vertices separating the regions of the Morse complex. Operations are performed to thicken the feature skeleton by replacing the plurality of longitudinally smooth edges with corresponding pairs of curves that locate longitudinal boundaries of transitions between primary regions of the feature skeleton.

The thickening operations may include replacing each of a plurality of vertices with a corresponding loop of edges, using setback-type vertex blends. In these embodiments, the plurality of edges and the plurality of vertices have assigned structural attributes. For example, the edges may be assigned structural attributes that identify them as "feature", "sharp" or "smooth" edges and the vertices may be identified as "general" or "collinear" vertices. The boundaries of the transitions and the boundaries of the vertex blends are located on the mesh in a manner that obeys the intrinsic geometric structure of the object. Special rules to create setback vertex blends are applied which facilitate the generation of high quality CAD models.

According to additional embodiments of the invention, the partitioning operations may use different piecewise linear indicator functions that approximate Morse functions characterizing various local geometric properties, including curvature, slippability, sweepability and proximity. The partitioning operations may also include partitioning the polygonal mesh using a combination of different indicator functions. The different indicator functions may be applied in a sequential manner. For example, the partitioning operations may be performed sequentially by partitioning three-dimensional object data into a first partition using one indicator function and further partitioning the first partition into a second partition using another indicator function. Additional functions (i.e., more than two indicator functions) may also be applied in the sequence. A weighted sum of different indicator functions that is constrained numerically or by markers may also be used. The weights may be computed by an iterative learning process using a sequence of markers assigned to the regions or separator sets of the three-dimensional object data.

According to still further embodiments of the invention, a three-dimensional surface structure is modeled by generating a hierarchy of topologically simplified partitions of three-dimensional object data using at least one piecewise linear indicator function. Operations are also performed to generate a feature skeleton having a plurality of longitudinally smooth edges and a plurality of vertices that extend between regions of a Morse complex associated with a selected one of the topologically simplified partitions in the hierarchy. This generated feature skeleton may then be thickened.

In additional embodiments of the invention, some of the operations associated with generating a feature skeleton may be omitted. In some of these embodiments, three-dimensional object data is initially partitioned into a plurality of regions of a Morse complex. A plurality of separator sets (e.g., a plurality of triangulated strips on the mesh), which extend along boundaries between the regions of the Morse complex, are then generated. A thickened feature skeleton of a three-dimensional object is then generated by smoothing edges of the separator sets. Operations to generate the thickened feature skeleton may also include generating a plurality of loops that locate vertex blends of the thickened feature skeleton at intersections of the plurality of separator sets.

Embodiments of the invention may also include modeling three-dimensional surface structures by partitioning three-dimensional object data into regions of a Morse complex using a weighted sum of different indicator functions having weights determined by iterative learning operations, which are constrained by markers assigned to regions and separator sets associated with the three-dimensional object data.

Embodiments of the invention typically operate on two types of three-dimensional object data. A "polygonal mesh" is assumed to be dense enough to represent all fine geometric details and appropriate neighborhood information. Alternatively, "point clouds" can provide a more compact, adaptive spatial representation with implicit connectivity information. Methods to create a surface structure by extracting information directly from point clouds are also provided.

In these embodiments of the invention, a general surface structure consists of (i) primary regions, (ii) connecting features forming transitions between adjacent primary regions, and (iii) vertex blends to connect converging features. Alternative surface structures with or without setback-type vertex blends can also be created.

BRIEF DESCRIPTION OF THE DRAWINGS

FIG. 1.1 is a summarizing flowchart that illustrates methods of modeling three-dimensional surface structures, according to embodiments of the present invention.

FIG. 1.2 is a flowchart that illustrates methods of modeling three-dimensional surface structures, according to embodiments of the present invention.

FIG. 1.3 is a flowchart that illustrates methods of generating Morse regions and separator sets, according to embodiments of the present invention.

FIG. 1.4 is a flowchart that illustrates methods of generating alternative surface structures, according to embodiments of the present invention.

FIG. 1.5 illustrates Morse regions, separator sets and a feature skeleton of a three-dimensional object, according to embodiments of the present invention.

FIG. 1.6 illustrates boundary curves, vertex blends and a final surface structure of a three-dimensional object, according to embodiments of the present invention.

FIG. 1.7 is a block diagram that illustrates a general hardware description of a computer workstation that performs operations according to embodiments of the present invention.

FIG. 2.1 illustrates a Morse complex with critical points and arcs according to embodiments of the invention; the open squares denote maxima, the open circles denote minima, the "X" labels denote saddles and the wide arcs connect saddles and minima.

FIG. 2.2 illustrates classifications of a vertex based on the relative heights of the vertices in its link, where the boldface edges and solid vertices belong to a lower link of the center vertex; the classifications include: regular point, minimum point, saddle point, maximum point and 2fold saddle point.

FIG. 2.3 illustrates a translational indicator computed on a Gaussian sphere.

FIG. 2.4 illustrates a proximity indicator using Voronoi diagrams on a polygonal mesh.

FIGS. 2.5a-2.5b illustrate a graph of a density function (h(x)) and a density function that has been depressed by a sigmoid (sigm(x)).

FIG. 2.6 is a graph that illustrates how variations in threshold setting can be optimized using an "a priori" classification; the graph also illustrates how a current threshold value "t" yields a false classification at x2 and x4.

FIGS. 2.7a-2.7b illustrate how markers placed in the separator set areas (squares) and markers placed in the primary regions (circles) can facilitate determination of an indicator that partitions an object.

FIG. 2.8 illustrates a structure of a neuron in a neural network.

FIG. 2.9 illustrates a star about the point u, where the unshaded triangles are processed before u and the shaded triangles in the lower star are added in sequence and meet at the edge uv with the lowest endpoint v; the arrows indicate the predecessor relationship.

FIGS. 2.10a-2.10c illustrate hierarchical segmentation with different sensitivity values.

FIG. 3.1a-3.1c illustrate Morse region boundaries, a feature skeleton and transition boundaries of connecting features, respectively, within a three-dimensional object.

FIG. 3.2 illustrates longitudinal feature tracing, according to embodiments of the present invention.

FIG. 3.3 illustrates an example of feature tracing and guided tracing along a simple vanishing feature determined by the local translation vector field; section AB represents a strong translational vector field (feature tracing) and section BC represents no translational vector field (guided tracing).

FIG. 3.4 illustrates a two-sided grid that approximates a sharpened edge.

FIG. 3.5 illustrates the ragged boundaries and an original vertex position (V0) of a T-node based on the Morse complex; P1, P2 and P3 are the estimated setback points, where the connecting features terminate.

FIG. 3.6 illustrates the smoothed boundaries and a modified vertex position (V) of a T-node using the feature skeleton.

FIG. 4.1 illustrates the use of the translational and similarity indicators, where point A in a flat area shows where translation is weak and similarity is strong, point B is on a feature boundary where translation exists and similarity is weak and point C is on a feature area where both translation and similarity are strong.

FIGS. 4.2a-4.2b illustrate thickening of a feature skeleton for a regular case and a degenerate case, respectively.

FIGS. 4.3a-4.3b illustrate thickening of a feature skeleton at a concave corner, where FIG. 4.3a illustrates extending boundaries up to a bisector and FIG. 4.3b illustrates inserting spring curves.

FIGS. 4.4a-4.4h illustrate six vertex blend configurations: (a) the prototypical suitcase corner; (b) vertex blend with setback; (c) edges blends with different cross-sectional curvatures creating an oddly shaped vertex blend; (d) section of the configuration in (c) along the diagonal plane that passes through the front and back edges; (e) solution of the blending problem in (c) using setbacks; (f) diagonal section of (e); (g) a 4-sided vertex blend with one spring curve; and (h) a 5-sided vertex blend with one cusp.

FIG. 4.5 illustrates the general setback type vertex blend and its parameters.

FIG. 5.1 illustrates different surface structures as created by the vertex of a feature skeleton; Model A1 illustrates insertion of a single spring curve, Model A2 illustrates a full setback type vertex blend, Model B illustrates no setbacks and Model C illustrates no vertex blends.

FIGS. 5.2*a*-5.2*d* illustrate alternative loop structures using a feature skeleton and its thickened boundaries, where FIG. 5.2*a* illustrates no interference, FIG. 5.2*b* illustrates self-intersecting boundaries, FIG. 5.2*c* illustrates an original loop structure preserved after thinning and FIG. 5.2*d* illustrates a new loop structure created after inserting a new vertex blend in the middle.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The operations of the present invention, as described more fully hereinbelow and in the accompanying figures, may be performed by an entirely hardware embodiment or, more preferably, by an embodiment combining both software and hardware aspects and some degree of user input. Furthermore, aspects of the present invention may take the form of a computer program product on a computer-readable storage medium having computer-readable program code embodied in the medium. Any suitable computer-readable medium may be utilized including hard disks, CD-ROMs or other optical or magnetic storage devices. Like numbers refer to like elements throughout.

Various aspects of the present invention are illustrated in detail in the following figures, including flowchart illustrations. It will be understood that each of a plurality of blocks of the flowchart illustrations, and combinations of blocks in the flowchart illustrations, can be implemented by computer program instructions. These computer program instructions may be provided to a processor or other programmable data processing apparatus to produce a machine, such that the instructions, which execute on the processor or other programmable data processing apparatus create means for implementing the operations specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the operations specified in the flowchart block or blocks.

Accordingly, blocks of the flowchart illustrations support combinations of means for performing the specified operations, combinations of steps for performing the specified operations and program instruction means for performing the specified operations. It will also be understood that each of a plurality of blocks of the flowchart illustrations, and combinations of blocks in the flowchart illustrations, can be implemented by special purpose hardware-based computer systems that perform the specified operations or steps, or by combinations of special purpose hardware and computer instructions.

Smooth and generic Morse functions provide a guide for the computations described herein, which work on piecewise linear functions that are specified at the vertices of a triangulation and are linearly extended over the edges and triangles of that triangulation. These piecewise linear functions, hereinafter called indicator functions, typically give a good approximation of different Morse functions. These indicator functions assign various numerical values to the data points to thereby characterize different local properties of the triangulation (i.e., mesh of triangles). For example, these indicator functions can range from simple scalar measures, such as curvature, to fairly complex quantities, such as vectors of a vector field. Other indicator functions highlight transitions to detect sharp edges or fillets, or mark out the shortest paths between edge loops. The values of the indicator functions can be estimated based on local point neighborhoods. However, because these values are model, noise and location dependent, partitioning the whole mesh manually by preset, global thresholds is typically very complex and computationally expensive. Instead, embodiments of the invention avoid the tediousness of partitioning based on global thresholds and generate surface structures using the intrinsic properties of Morse complexes defined over the mesh.

Complex mechanical engineering objects are typically designed by alternating sequences of various operations. These operations include creating primitive solid objects and/or constructing complex surfaces, transforming them into appropriate position and orientation in 3D, performing Boolean operations or surface-surface intersections, and, finally, replacing sharp edges by fillets or more complex transition surfaces. As a result, a typical CAD model consists of a set of faces having the following surface hierarchy: (i) the shape is determined by large functional surfaces, called "primary surfaces", (ii) the primary surfaces may intersect or smoothly join each other, or they may be connected by means of relatively small "transitional surfaces," such as fillets or free-form steps (hereinafter also referred to as "connecting features"), and (iii) at the junctions where the transition surfaces converge, there are small smoothly connecting surface pieces, called "vertex blends." Embodiments of the invention described herein automatically create a global structure that captures the above hierarchy of surfaces.

Vertex blends play an important role in CAD and digital shape reconstruction and their structure may be deduced from point data. As will be understood by those skilled in the art, the boundaries of adjacent transition surfaces either intersect each other, or in more complex cases, the boundaries are terminated before the intersection point and smooth arcs, called "spring curves", are inserted. This more complex case leads to the general class of "vertex blends with setbacks." One approach to handle setbacks is described in a book chapter authored by T. Varady et al., "Vertex Blending: Problems and Solutions," Mathematical Methods for Curves and Surfaces II, Vanderbilt University Press, pp. 501-527 (1998).

Section 1—Overview of Preferred Embodiments

Automatic shape reconstruction operations according to some embodiments of the invention are illustrated by the flowcharts of FIGS. 1.1-1.4. In these embodiments, an initial data structure that is generated, Block 100 can be a triangulated mesh (Block 120) or a structured point cloud having associated adjacency information (Block 140). Characteristics of these types of data structures are well known to those skilled in the art and are highlighted in commonly assigned U.S. Pat. Nos. 7,023,432 to Fletcher et al. and 6,996,505 to Edelsbnmer et al., the disclosures of which are hereby incorporated herein by reference. Other data structures may also be utilized.

As illustrated by Block 200, Stage 1 processing includes generating a segmentation of a polygonal mesh (derived from the initial data structure) into regions of a Morse complex. As described more fully hereinbelow, operations to generate this segmentation may include using a particular watershed algorithm, which works with a function defined on a surface of the polygonal mesh instead of directly with the surface. Mathematical concepts of persistence and prioritization may be used to generate a hierarchy of topologically simplified segmentations that adapt to features at varying levels of resolution. One segmentation may then be selected using either a predefined or computed sensitivity to obtain a desired level of resolution. Boundaries of monotonic regions generated within the segmentation form a combinatorially correct curve network, in the sense that they are combinatorially indistinguishable from ones obtained using a real Morse function. However, because operations described herein use piecewise linear approximations of Morse functions, numerical artifacts in the form of ragged boundaries may delimit various regions within the segmentation.

Using a Morse segmentation, additional mesh operations are performed by thickening the boundaries on the mesh. These operations to "thicken" boundaries may also be referred to herein as "widening" boundaries because this latter term emphasizes how these operations create strips that are strictly located on the mesh. As a result of thickening, strips of triangles, referred to herein as "separator sets", are created and the original regions of the Morse segmentation are reduced in size. By performing these operations, the triangles of the relatively flat regions and the highly curved transitions between the flat regions may be clearly separated, with the region boundaries running along polylines of triangle edges.

Referring now to Block 300, Stage 2 processing includes generating an intermediate data structure called a "feature skeleton." This intermediate data structure is a curve network with edges running in the middle of the separator sets. To obtain longitudinally smooth edges that cut through the triangles of the mesh, curve-tracing algorithms may be applied using an estimated translational vector field. As shown in FIG. 1.5, which illustrates an exemplary object highlighting Stages 1-2 of the operations described herein, a separator set may indicate: (i) a smooth connecting feature between two adjacent regions, such as a fillet, (ii) a sharp feature, where there is tangential discontinuity between two surfaces, or (iii) a smooth subdividing curve that is defined or computed to cut large regions into smaller ones, or connect internal loops to their perimeter loop. The corresponding three types of edges of the feature skeleton (Block 320) should be classified in advance because they will require different computational processing. "Feature edges" are only temporary structures, which will ultimately be replaced by a pair of boundary curves. "Sharp edges" should be extracted with precision from the polygon model, because these edges will become boundaries in a final surface structure. Smooth "subdividing curves" lie in the interior of regions where there is little or no curvature variation and where thickening is not required. Vertices of the skeleton also need to be classified, Block 350. In particular, "collinear" edge pairs are identified that approach a vertex from opposite directions. Specific instances of collinear edge pairs include T-nodes, which are degree-3 vertices with one pair of collinear edges, and X-nodes, which are degree-4 vertices with two pairs of collinear edges. Collinear edge curves will be smoothed as a single entity and will indicate where spring curves need to be inserted and thereby indirectly define the final configuration of the related vertex blend.

Referring now to Blocks 400 and 500 of FIG. 1.1, Stage 3 processing includes generating boundary curves for transitional surfaces (individual connecting features) and generating vertex blends. In particular, operations associated with Block 400 include replacing each of a plurality of feature edges with a pair of longitudinal boundaries. Different algorithms are applied to locate edges for fillets, free-form steps or more complex connecting features. Then, in response to determining the widths of the boundaries, the exact setback values (Block 560) for the vertex blends are determined. Each vertex of the skeleton may also be replaced by a loop of profile curves and spring curves. These curves generally follow each other in an alternating sequence, or can become degenerate in other cases (Block 520). The profile curves terminate the corresponding connecting features in the cross-sectional direction (Block 540). The spring curves connect pairs of adjacent feature boundaries lying on the same primary region (Block 580). Spring curves need to be inserted because of the collinear edges set in Stage 2, or other geometric constraints that require the formation of smooth transitions between various connecting features.

As illustrated by Blocks 600 and 700 of FIG. 1.1 and the object of FIG. 1.6, Stage 4 processing includes generating a thickened feature skeleton, which determines a unique structure with primary regions, and connecting features and vertex blends. The connecting feature regions are four-sided regions that lie between two primary regions and are terminated by two vertex blends (Block 620). The vertex blends operate to terminate the features, but they may also share spring curves with the primary regions (Block 640). Two such spring curves can be depicted in FIG. 1.6, with each representing a boundary between a 4-sided vertex blend and the large primary region in the middle. The primary regions may contain an arbitrary number of hole loops, but the vertex blends are simply-connected n-sided regions with no holes. The edges of the thickened feature skeleton may contain self-intersections, which should be removed and substituted with alternative surface structure(s) in order to achieve a valid structure, Block 700.

The operations described herein result in a geometrically well-aligned structure, which is a necessary prerequisite for high-quality surface fitting. The resulting relatively large primary regions are, by construction, devoid of highly curved features. To approximate them, either (i) a quadrangular tiling operation or (ii) a trimmed surface operation can be applied. The connecting feature surfaces can be approximated by (i) a double strip of quadrangles or (ii) special surfaces, such as single- or variable-radius rolling ball blends. Finally, the vertex blends can be approximated either as (i) a composite surface of connected quadrangles, sharing a common center point, or (ii) by a single trimmed surface being constrained to its neighbors.

Alternatively, operations described herein may create geometrically well-aligned surface structures without generating an initial feature skeleton, by determining separator sets and generating a thickened feature skeleton from the separator sets. According to these operations, the Stage 1 operations include generating thickened separator sets that are partitioned together with performing edge and vertex classification. Vertex blend regions are separated from other regions using vertex blend indicators. In order to detect collinear edges and determine the type of the vertex blends, operations using pair-wise track assignments are performed. After separating the vertex regions, the disconnected transition areas between the vertex regions are classified by detecting connecting features, sharp edges and smooth subdividing regions. Modified Stage 3 operations include using the partitioned separator sets to create longitudinal boundaries and loops around the vertex blends. Curve tracing operations also use local vector estimates of a translational field to control the tracing process and stabilizing components are derived from polyline boundaries of feature separator sets. Estimations of setbacks and computations of spring curves and profile curves follow similar steps, but spring curves can be traced using the boundaries of the vertex separator sets.

Referring now to FIG. 1.7, a general hardware description of a custom CAD/CAM workstation 800 is illustrated as including, among other things, software and hardware components and modules 830 that perform the operations described hereinabove, including those illustrated by FIGS. 1.1.-1.4. The workstation 800, which is one embodiment of an apparatus, includes a computer-aided design tool 820 that may accept a point cloud data set via a file 804, a scanner 806, data bus 802 or other conventional means. A display 810 and a printer 808 may also be provided to assist in performing the operations of the workstation 800. The hardware design of the components 804, 806, 808 and 810 is well known to those skilled in the art and need not be described further herein. The workstation 800 preferably includes a computer-readable storage medium having computer-readable code embodied in the medium. This computer-readable program code is readable by one or more processors within the workstation 800 and tangibly embodies a program of instructions executable by the processor to perform the operations described herein.

Section 2—Stage 1 Details: Hierarchical Morse Complex Segmentation 2.1-Morse Theory In this section, a mathematical description of Morse complexes and operations used to construct them will be provided. Techniques to create, select and combine various indicator functions will also be described. A large fraction of the algorithmic description is devoted to bridging the gap between the assumptions needed for the mathematics to work on input data that can be realistically expected. The mathematical operations described herein are based on smooth or at least $C^2$-continuous functions, yet are actually performed on piecewise linear functions.

As understood by those skilled in the art, classical Morse theory evaluates critical points of generic smooth functions on manifolds. To begin, let M be a 2-manifold, assume a Riemannian metric on M, and let $f: M \rightarrow R$ be a smooth function. The value $f(a)$ will be referred to as the height of the point $a \in M$. Assuming an orthonormal local coordinate system, the gradient at a is the vector of partial derivatives:

$$\nabla f(a) = \left[ \frac{\partial f}{\partial x_1}(a), \frac{\partial f}{\partial x_2}(a) \right]^T$$

The point a is critical if its gradient is the zero vector, but regular otherwise. Using again the local coordinate system, the Hessian at a is the matrix of second derivatives:

$$H(a) = \left[ \frac{\partial^2 f}{\partial x_i \partial x_j}(a) \right], \text{ for } 1 \leq i, j \leq 2.$$

A critical point is non-degenerate if its Hessian is nonsingular, which is a property that is independent of the coordinate system. According to the Morse Lemma, every non-degenerate critical point a permits a local coordinate system such that $f$ takes the form $f(x_1, x_2) = f(a) \pm x_1^2 \pm x_2^2$ in a neighborhood of a. This implies that non-degenerate critical points are isolated. The number of minus signs is the index of a and distinguishes the different types of critical points: minima have index 0, saddles have index 1, and maxima have index 2. Technically, $f$ is a Morse function if (i) all critical points are non-degenerate; and (ii) the critical points have pair-wise different heights.

The gradient forms a smooth vector field on M whose zeros coincide with the critical points of $f$. Any regular point has a non-zero gradient vector, and if that vector is followed, it will trace out a curve on the surface. An integral line is a maximal such curve; it starts at a critical point and ends at another critical point without containing either endpoint. Because $f$ is smooth, two integral lines are either disjoint or the same. The descending manifold of a critical point a is the set of points that flow toward a. More formally, it is the point a together with all points that lie on integral lines ending at a. For example, the stable manifold of a maximum is an open disk, that of a saddle is an open interval (the saddle is a union of two integral lines), and that of a minimum is a point (the minimum itself). The collection of descending manifolds is a complex, in the sense that the boundary of every cell is a union of lower dimensional cells. FIG. 2.1 illustrates a Morse complex 21 with its critical points and connecting arcs. The open squares in FIG. 2.1 denote maxima, the open circles denote minima, the "X" labels denote saddles. FIG. 2.1 shows four disjoint regions, one for each maxima. The wide arcs connect each saddle with two minima, thus forming boundaries that separate the regions. The narrow arcs represent integral lines running from the maxima to the saddles.

Combinatorial Topology

Concepts from combinatorial topology are used to turn the mathematical ideas of Morse theory into algorithms that operate on practical data. An assumption is made that the 2-manifold M is given in terms of a triangulation K, which is a two-dimensional simplicial complex homeomorphic to M. The function $f$ is explicitly given at the vertices and is linearly interpolated over the edges and triangles of K. Standard concepts are used to describe the local neighborhood of a vertex u: the star St u, which consists of all simplices in K that contain u; and the link Lk u, which consists of all edges and vertices of the simplices in the star that are disjoint from u. Since K triangulates a 2-manifold, the link of every vertex is a topological circle. Portions of stars and links are used to extend the notion of a critical point to the piecewise linear domain: the lower star of u contains all simplices in the star for which u is the highest vertex, and the lower link contains all simplices in the link whose endpoints are lower than u:

$$St\_u = \{\sigma | v \in \sigma \Rightarrow f(v) \leq f(u)\};$$

$$Lk\_u = \{\tau | v \in \tau \Rightarrow f(v) < f(u)\};$$

Here the function values of any two vertices are assumed to be different. This is not a restriction of generality since vertices are indexed, and if two vertices happen to have the same function value then the value of the vertex with the smaller index is treated as being smaller than the value of the vertex with larger index. With this assumption, the lower link contains exactly the edges and vertices bounding simplices in the lower star that do not themselves belong to the lower star.

Topologically, the lower link is a subset of a circle, and the structure of that subset determines whether or not u is critical. FIG. 2.2 illustrates classifications of a vertex based on the relative heights of the vertices in its link, where the boldface edges and solid vertices belong to a lower link of the center vertex. The classifications include: regular point, minimum point, saddle point, maximum point and 2fold saddle point. Referring now to FIG. 2.2, the lower link of a maximum is the entire link and that of a minimum is empty. In all other cases, the lower link consists of $k+1 \geq 1$ connected pieces, each being a closed interval or a point. The vertex u is regular if $k=0$, and a k-fold saddle if $k \geq 1$. It is not difficult to see that a k-fold saddle can be split into k simple (or 1-fold) saddles. The significance of the above definition of criticality can be seen by considering the effect of a vertex in the incremental construction of K. Sort the vertices in increasing height, let $u_i$ be the i-th vertex in the ordering, and let $K_j$ be the union of the first j lower stars. Since all vertices $u_i$ of a simplex in the lower star of $u_j$ satisfy $i \leq j$, a nested sequence of complexes can be obtained:

$$0 = K_0 \subset K_1 \subset \ldots \subset K_j \subset \ldots \subset K_n = K.$$

If $u_j$ is regular then there is no difference in how $K_{j-1}$ and $K_j$ are connected. Otherwise, there is a difference, which may be in the creation of a new component or a new cycle or in the destruction of a component (by merging it with another one) or a cycle (by filling the hole it defines). An exception is the last lower star, which completes the 2-manifold and thus creates a shell instead of destroying a cycle. Every destruction destroys something created earlier and the vertex that destroys is paired with the vertex that created what the other one destroys. An algebraic justification of this pairing mechanism, along with a proof that it is always well defined, can be found in an article by H. Edelsbrunner et al., entitled "Topological Persistence and Simplification," Discrete Computational Geometry, Vol. 28, pp. 511-533 (2002), the disclosure of which is hereby incorporated herein by reference. The pairing is the key to the definition of the importance of a critical point: the persistence of a vertex u is the absolute height difference to its paired vertices, $|f(u)-f(v)|$. The persistence is, in turn, the key to simplifying the Morse complex.

Persistence Algorithm

The algorithm that pairs creating with destroying critical points will now be described. In this algorithm, creating minima get paired with destroying saddles and creating saddles get paired with destroying maxima. The input is the triangulation K of a 2-manifold without boundary and a piecewise linear map $f: K \rightarrow R$. Before running the algorithm, the vertices are sorted in the order of increasing height: $f(u_1) < f(u_2) < \ldots < f(u_m)$. A union-find data structure is used for maintaining an initially empty set system. In the first pass, all minimum-saddle pairs are determined:

```
for j =1 to m do
    add {u_j} as a new set to the set system;
    forall neighbors u_i of u_j with i<j do
        j_0 =Find(u_j); i_0 = Find(u_i);
        if j_0 ≠ i_0 then Union(j_0,i_0);
            if j_0 ≠ j then
                output the pair (max {j_0,i_0},j)
            endif
        endif
    endfor
endfor.
```

Here, it is assumed that when Union merges two trees (sets) it copies the older of the two root vertices to the new root and thus makes the new oldest vertex the representative of the set. This way, Find automatically returns the oldest vertex in the accessed component. The crucial portion of the algorithm consists of the two nested if-clauses in the inner for-loop. The first clause detects when the edge $u_iu_j$ connects two formerly separate components. The first time this happens, $j_0 = j$ and no pair is yet determined. If it happens a second time, a destroying saddle is present and a minimum-saddle pair is obtained. For a simple saddle this is all that can happen, but for an l-fold saddle as many as l such pairs may be determined. The running time of the algorithm is $O(n\alpha(n))$, where $n>m$ is the number of edges in K and $\alpha$ is the inverse of the Ackermann function. The saddle-maximum pairs are obtained by running the exact same algorithm backward for $j=m$ down to 1 and processing neighbors $u_i$ of $u_j$ with $i>j$.

It is not entirely obvious that this generates the same pairs as the original persistence algorithm generates in the forward direction, but a proof that it does can be found in an article by P. Agarwal et al., entitled "Extreme Elevation on a 2-manifold," Proceedings of the 20$^{th}$ Annual Symposium on Computational Geometry, pp. 357-365 (2004). The total running time is therefore $O(m \log m)$ for sorting plus $O(n\alpha(n))$ for generating the pairs.

2.2—New Indicator Functions

Morse functions characterizes the structure of an unknown object. If the object is represented by a mesh or a point cloud, see Block 200, the values of this function can only be estimated at discrete points. These values are referred to as indicators and the function is referred to as an indicator function. These functions are used to distinguish (i) highly curved from relatively flat region, (ii) to draw subdividing lines inside flat regions and (iii) to detect special features, such as fillets or sharp edges. When the emphasis is on identifying a particular property, the function will be referred to as a filter. Specific indicator functions to be generated, Block 210, will now be proposed, which can be used in the forthcoming phases of Morse complex segmentation and feature skeleton extraction: slippability, sweepability, and proximity.

Slippability

Rotating a sphere about its center does not change the surface even though almost all of its points move to different locations. Because of this property, the sphere is treated as being "slippable." A local notion of this concept may be used to express, for example, that a cube is slippable at all points, excepts its eight corners, and the slipping motion for a point on an edge has one degree of freedom while for a point on a face it has two degrees of freedom. To turn this idea into a function, a 6-by-6 separation matrix is used, which measures the separation between a neighborhood of the point and its image under an infinitesimal rigid motion. Strictly speaking, the surface is not slippable at the point if and only if the separation matrix has full rank. The rank deficiency is equal to the dimension of the slippable motion. The symmetric values of the separation matrix (including the determinant and the trace) are used to measure to what extent the surface is slippable at the point, thus turning the Boolean into a numerical property expressed by real numbers.

Sweepability

There are several indicator functions that are closely related to the curvature of surfaces and thus help to separate highly curved and relatively flat regions. Highly curved regions can be directly characterized by estimated principle curvature values $\kappa_1$ and $\kappa_2$, the mean curvature $M=(\kappa_1+\kappa_2)/2$, and the Gaussian curvature $G=\kappa_1\kappa_2$. It is assumed that $|\kappa_1| \geq |\kappa_2|$. If both principle curvatures are zero, then a locally planar surface (i.e., G=0) is present. If $\kappa_2=0$, then the surface is locally swept, and $\kappa_1$ yields the reciprocal value of the radius of a locally fitted cylinder. In this case, a locally ruled surface (i.e., G=0, but M≠0) is present. If none of them is zero, a locally doubly-curved surface is present. According to conventional methods, curvatures can be derived from implicit functions fitted in a given point neighborhood. The Gaussian curvature indicates whether the surface is swept or not, since G=0 implies $\kappa_2=0$.

In addition to the sweepability property, the translational strength, which is indirectly related to the ratio of the two principle curvatures $\kappa_1/\kappa_2$, $\kappa_2\neq0$, should also be characterized. For example, for an apple-like (self-intersecting) torus, this ratio is near to 1, which indicates a weak translation. For a torus having a small revolving circle, this quantity is large, indicating a strong translation. This indicator highlights the relatively narrow connecting features, including fillets, steps, ribs and slots, which is particularly useful in the segmentation operations described herein.

An alternative method to compute the translational indicator without implicit surface fitting is proposed. Take the normal vectors $N_i$ in a given neighborhood of a vertex on the mesh and view them as points on the Gauss sphere. The endpoints of these normal vectors may fall into a small cluster, which indicates local planarity. If the points are distributed along a "thick" curve, it shows a strong translational characteristic, otherwise the points are distributed in a larger area, and the surface is doubly-curved locally. The translational strength can be estimated by means of the error term of the least-squares plane fitted to the nominal vectors $N_i$ on the Gauss sphere and going through the origin. It is well known that this computation leads to solving an eigenvalue problem. The smaller the first and the greater the second eigenvalue are, the stronger the translation is at the given location. This method is illustrated by the narrow sector on the Gauss sphere 20, as shown in FIG. 2.3.

Proximity

While the previous indicator functions separated the relatively flat areas from the highly curved ones, further indicators are needed to generate separators within primary regions. For example, smooth subdividing edges may need to be inserted when (i) a single surface is not sufficient to approximate the whole region, or (ii) there are several hole loops within the region. The theory of Voronoi diagrams may be exploited. The graph of a Voronoi diagram partitions a region into subregions. Each subregion is associated with a particular section of the boundary; all points within this subregion are closer to this boundary section than to any other sections. The edges of the Voronoi diagram represent the locus of points, which are equally distant from the two "opposite" boundary sections, as illustrated by the dashed curve loop in FIG. 2.4. A Voronoi edge couples the points of two adjacent subregions and corresponding boundary sections. When complex regions need to be subdivided, the so-called necks can serve as natural subdividing edges. A neck represents the shortest segment between two opposite boundary sections.

While the conventional theory of Voronoi diagrams relates to planar regions, in this context it is used to deal with triangular regions of a polygonal mesh in 3D. Before going further, an approximate distance measure over the region is needed that is associated with its individual boundary loops. An approximate distance can be the length of the path defined by the triangle layers, as they grow from the perimeter loop inside, or from the hole loops outside. Alternatively, the arc length of the geodesic curves gives an approximate distance between the current point and the closest boundary. Finally, an appropriate planar distance measure can be defined, assuming the triangular mesh has been flattened.

To illustrate how a Morse complex based on proximity is created, a simple example with two loops was chosen, as shown in FIG. 2.4. Two opposite subregions, which are considered, denoted by i and j, and the correspondence between the boundary sections is determined by the Voronoi structure. Take an internal point P, its region is indexed by i, and the corresponding boundary points $P_i$ and $P_j$. $P_j$ is defined in the opposite region through a corresponding point T on the Voronoi edge. An indicator function is defined as $f=d_i^2+(d_j+d_{iO})^2$, where $d_i$ denotes the distance to the closest boundary, $d_{iO}$ is the distance to point T, $d_j$ is the shortest distance between point T and the coupled boundary point $P_j$. If P is on the Voronoi edge, then $d_{iO}=0$. The indicator function $f$ has local minima along the Voronoi edges and on the necks connecting the closest points of the two opposite boundary sections. The critical points of the structure are denoted by m (minimum), M (maximum) and s (saddle) (in FIG. 2.4: i=2 and j=1). Another way to highlight necks is to use a function that measures the angle between the two tangent vectors at the related edge point T. This angle will be very close to 180 degree for the necks, and differ from 180 for all other points, as illustrated by vectors $TP_1$ and $TP_2$ in FIG. 2.4.

2.3—Combination of Indicator Functions

In addition to the previously described indicator functions, new indicator functions can be derived from existing ones, Blocks 230, 240 and 250. One way to do this takes the functions in sequence, another one combines functions to highlight or depress features by different properties. There are various techniques to optimize the weights of the indicator functions, including methods driven by user-defined markers.

Applying a Sequence of Functions

There are multiple ways of applying indicator functions in a sequence, where indicators are sensitive to different properties, Block 240. Two typical examples are given below. Assume it is necessary to decompose the mesh into simple, analytic surface shapes (portions of planes, spheres, cylinders, cones) and free-form surface elements. The simple shapes are slippable, which suggests initially using slippability to find the simple shapes and then using a curvature function to decompose the remaining shapes.

It may also be necessary to decompose smooth regions within a complex shape after a curvature-based segmentation has taken place. First, a method of local curvature estimation is applied, and then the remaining regions are subdivided by approximating the geodesic distance to the boundary, as was previously proposed using proximity.

Combination of Functions

There are various ways to combine indicator functions, Block 250. For example, the first sequential test identified above can be translated into a single (composed) indicator function, where the minors of the separation matrix are averaged with the curvature approximation.

Surface portions that should not be considered as "highly-curved" can be excluded by numerically defining a curvature bound. To depress values below or above prescribed thresholds, smooth continuous transition functions having a sigmoid shape are used. Take, for example, $tansig(x)=2/(1+e^{-2x})$ or $logsig(x)=1/(1+e^{-x})$, and shift the function along the x axis by the given bound. FIGS. 2.5(*a*)-2.5(*b*) show an example where, after multiplying with the sigmoid (sigm(x)), the lower range of the original density function h(x) is removed (see solid vs. dotted lines).

While in the majority of cases one (or two) indicator functions can provide an appropriate segmentation, if the data set is noisy and the object shows extreme geometric variations several indicator functions $f_1, f_2 \ldots f_M$, which highlight different geometric features may need to be used simultaneously, and this determination may be complex. One possible method is to form a weighted sum, as $f=\Sigma \alpha_k f_k$. The weights $\alpha_i$ can be numerically set by the user based on previous experience or can be determined by an optimization method, where user assistance may be provided to supplement the previous automatic techniques, Block 251. Optimization methods include optimization by markers and optimization by iterative learning, as will now be described in Blocks 253 and 255, respectively.

Optimization by Markers

Assume there exists an indicator function $f(x)$, and it is necessary to classify whether the points belong to the separator set (1) or a region (0). Using a threshold t, let $G(f(x))=1$, if $f(x)>t$, and $G(f(x))=0$, otherwise. The threshold t is unknown, and the goal is to optimize this by means of user selected data points $x_i$, and assigned $L_i=1$ or 0 values. In FIG. 2.6, a one-dimensional example is shown with a preset threshold t. Based on an apriori classification (e.g., based on user-defined markers), data points $x_1, x_4$ are classified as "0"; $x_2, x_3$ and $x_5$ as "1". As can be seen, the current threshold yields false decisions at $x_2$ and $x_4$ (e.g., at $x_2$, a value "1" is expected but the threshold yields "0"). In order to find an optimal threshold, two functions are proposed. The first one minimizes the squared deviations $d_i$ only in the case of "false" decisions; the second one searches for the maximum of the sum of squared deviations, where "correct" and "false" deviations are taken with positive or negative signs, respectively (i.e., the magnitude of the separation is also considered). These terms are formulated using different sigmoid functions.

1. For $I_1$, $\text{sigm}_1(x<<0)=0$, $\text{sigm}_1(x>>0)=1$ and $\text{sigm}_1(0)=0.5$.
Then
$I_1(t)=\Sigma_{i1} d_{i1}^2 \text{sigm}_1(f(x_{i1})-t)+\Sigma_{i2} d_{i2}^2 \text{sigm}_1(t-f(x_{i2}))=\min$,
with index sets $\{i1: L_{i1}=0 \text{ and } G(f(x_{i1}))=1\}$ and $\{i2: L_{i2}=1 \text{ and } G(f(x_{i1}))=0\}$ 2. For $I_2$, $\text{sigm}_2(x<<0)=-1$, $\text{sigm}_2(x>>0)=1$ and $\text{sigm}_1(0)=0$. Then
$I_2(t)=\Sigma_{j1} \text{sigm}_2(t-f(x_{j1}))+\Sigma_{j2} d_{j2}^2 \text{sigm}_2(f(x_{j2})-t))=\max$,
with index sets $\{j1: L_{j1}=0\}$ and $\{j2: L_{j2}=1\}$.

In FIG. 2.6, based on the given t: $I_1=d_2^2+d_4^2$ and $I_2=d_1^2-d_2^2+d_3^2-d_4^2+d_5^2$. Using these formulae, a satisfying threshold can be determined after a few iterative steps. Having several indicator functions $f_k, k=1, \ldots, K$, some heuristics are needed on how to weight them. For each $f_k$, an optimal threshold $t_k$ can be determined using the set of samples $L_i$, $i=1, \ldots, n$, provided by the user and evaluating the related $I_1$ or $I_2$. Using the $I_1$ functional, large weights are assigned to those indicator functions that minimize the false squared deviations. For $I_2$, the larger separation values and the smaller false deviations together will be emphasized.

Optimization by Learning

An approach borrowed from artificial intelligence is to work with a set of different indicator functions and create a weighted sum using an iterative learning process via neural networks. After selecting the best functions, the user picks points (i.e., markers) on a mesh that belong to the feature regions, followed by picking a few other points (i.e., markers) lying on the remaining parts (e.g., primary regions) of the mesh. The self-learning system will find the best combination of the functions to highlight or depress regions as "demanded" by the chosen markers. If this is not satisfactory, the process can be repeated until the requested result is obtained. This process is illustrated in FIGS. 2.7a-b, where markers placed in the requested separator set areas (squares) and markers place in the requested primary regions (circles) generate a global indicator function that partitions the illustrated object.

The theory of neural networks is well established. The structure of the basic unit, the neuron, can be depicted as shown in FIG. 2.8. The input values $(g_k)$ are multiplied by weights $(w_k)$ and shifted by a so-called bias (b) value, which is transferred by a sigmoid function to obtain the output value $o=\text{sigm}(\Sigma g_k w_k+b)$. A network with two layers of neurons is proposed. After normalization, each indicator function is connected with each neuron of the first layer. To train the network, markers and corresponding classifications $L_i$ are used. The training algorithm, called back-propagation, will iteratively set the values of the weights and the biases, in such a way that the computed parameters will minimize the error over the whole set of samples. Once trained, the new sample points will be evaluated using the network. Moreover, having the first layer of weights, one can find out how the individual indicator functions need to be combined in order to match the given sample set.

2.4—Construction of the Morse Complex

This section describes operations for constructing the regions determined by the Morse complex, Block 200 (FIG. 1.1). The goal is to construct a segmentation of the model into regions separated by "rivers" that flow through locally minimal function values. Each region represents a slightly shrunk version of the descending manifold of a maximum, while the "rivers" contain the minimum and saddle points along with the curves that connect them.

Order Instead of Flow

A piecewise linear function is not smooth, which poses some challenges when constructing, or even just defining, the complex in the piecewise linear case. An ordering of the triangles is substituted for the gradient and is used to accumulate the triangles in sets that resemble the descending 2-manifolds in the smooth case. To describe the ordering, recall that the vertices of the triangulation K of M are ordered by height as $f(u_1)<f(u_2)<\ldots<f(u_m)$. The lower stars of the vertices partition K and the union of the first j lower stars is the subcomplex $K_j$ of K.

The triangulation is proposed from top to bottom, adding the lower stars of $v_{m-j+1}$ in the j-th step. In other words, the first j steps process the complement of $K_{m-j}$, which is an open set of simplices of K. The triangles in the lower star of $v=v_{m-j+1}$ are also added in order. If v is regular, then this order shrinks the sector of triangles in the lower star from the ends, meeting at the edge uv with minimum $f(v)$. As illustrated in FIG. 2.9, each triangle r in the lower star of a has a unique predecessor, which is the adjacent triangle in the star 22 that has been processed before τ. The last triangle has two such adjacent triangles, one the predecessor and the other adjacent across the edge uv. There are always at least two triangles in the star 22 that do not belong to the lower star, which implies that the predecessor relation is well defined. There is, however, the possibility that the lower star contains only one edge, uv, and no triangle. If u is a k-fold saddle, then a k+1 sector is present in the lower star, and each is treated in the way described for the regular case. If u is a maximum then the ordering is not important, and if u is a minimum then there are no triangles to order.

for j=m downto 1 do
    case $u_j$ is a maximum:
        label each triangle in St $u_j$ with j
    case $u_j$ is regular:
        label each triangle in St $u_j$ as its predecessor;
        if $u_j$ is marked then mark $u_j v_j$ and $v_j$ endif
    case $u_j$ is a saddle: mark $u_j$;
        treat each sector in St $u_j$ like in the regular case
    case $u_j$ is a minimum: mark $u_j$
    endfor.

Other than sorting the vertices, all operations are local and take only constant time. Even sorting the triangles in the lower star is constant time per triangle because each step makes a selection from two. The running time is therefore O(m log m) for sorting plus O(n) for labeling all triangles and marking some of the edges and vertices. We expect that the majority of edges and vertices belong to the interior of regions and not to the boundary. It is therefore less expensive to mark the boundary than to unmark the interior.

This algorithm guarantees that the regions are open disks. The Open Disk Lemma proves that the topology of the regions is the same for smooth and for piecewise linear functions. The main difference between the two categories is in the behavior of the boundary. In the smooth category, it consists of pairwise disjoint descending 1-manifolds and their common endpoints, which are minima. In the piecewise linear category, the boundary paths emanating from the saddles can merge prematurely at saddles or at regular vertices. The algorithm does not keep track of individual boundary paths and can thus afford ignoring such events.

Hierarchy and Choice of Segmentation

Operations to generate a hierarchy of segmentations will now be described, Block 260 (FIG. 1.3). Let M be the Morse complex generated with the watershed algorithm and let in be the number of regions, one per maximum of the function. This is the finest segmentation in the hierarchy. Coarser segmentations are generated by merging regions, making sure that the new regions remain simple (topologically equivalent to open disks). A convenient way to compute such a coarser segmentation is by labeling the maxima 'on' and 'off' and to run the algorithm so it constructs a region for each 'on' maximum, merging the regions of the 'off' maxima into the former. Minor modifications of the algorithm suffice to achieve this result. When reaching a saddle at which two regions generated by maxima u and v meet, a distinction is made between the following three cases:

1. u≠v and both are 'on'. Start a separating curve that extends in two directions away from the saddle.
2. u≠v and v is 'off' (u may be 'on' or 'off'). Do not start a separating curve, effectively merging the two regions. Designate u as the generator of the merged region.
3. u=v. Start a separating curve (as in Case 1) to prevent the region from becoming non-simply connected.

Given an assignment of 'on' and 'off', this algorithm gives a unique segmentation. Alternatively, the same segmentation may be constructed by erasing curves from M. The latter strategy has two crucial advantages: (i) other than canceling saddles with maxima (by erasing curves from M), saddles with minima can also be cancelled (by contracting curves with degree-1 endpoints); (ii) the sequence of cancellations defines a corresponding sequence of progressively coarser segmentations (the hierarchy).

Given a numerical assessment of the importance of a maximum or minimum, B(u), a unique hierarchy is constructed by canceling the maxima and minima in the sequence of increasing B-value. To cancel a maximum, the curve generated by the highest saddle in its boundary that separates the region from another is removed. To cancel a minimum that is the endpoint of a single curve, the curve is removed together with the minimum. Minima that belong to two or more curves are not immediately removed but later lead to cascading removals when their degree drops to 1.

To select a segmentation from the hierarchy, a sensitivity threshold is specified and the segmentation obtained after canceling all extrema with B-values below the threshold is returned. The sensitivity threshold may be provided by the user or computed from an assessment of how complicated the surface is and how fine a segmentation is desired. Most naturally, sensitivity would be computed while the hierarchy is created since the history of the B-value and the number of regions offers a rough idea of both the complexity of the surface and the resolution of the segmentation.

A simple example is shown in FIGS. 2.10*a-c*, where a given mesh of an object is partitioned in three different ways. The narrow lines indicate that this is an object with multiple fillets; the first sensitivity value splits the object only into two regions F1 and F2; the next sensitivity value splits F2 into two further regions F21 and F22, while the highest sensitivity value generates the most detailed region structure of F221, F222, F223 and F224. The boldface curves represent the associated feature skeleton curve networks.

Prioritizing Cancellations

A method to prioritize the cancellations is based on the idea of persistence, Block 270 (FIG. 1.3), which is also described in the aforementioned Edelsbrunner et al. article. Here the minima and maxima are paired with the saddles and the persistence of a pair is the absolute difference in function value between the two critical points. Some critical points are responsible for the topology of the surface (a minimum for its existence, saddles for the genus, and the maximum for it being closed) and they are not paired and are assigned infinite persistence. The main advantages of persistence over other prioritizations are (i) it can be computed very efficiently using a union-find data structure; (ii) for each maximum and minimum the corresponding saddle is prescribed. The main disadvantage of persistence is its sole sensitivity to function value. Depending on the application, other criteria may be more important, such as the size and shape of the regions. This is why it is important to have the more flexible definition of hierarchy described above, which can be driven by various assessment measures.

2.5—Generating Separator Sets

In the previous steps, Morse segmentation led to the fundamental region structures that will be dealt with in the forthcoming phases. Regions are separated by ragged polylines of successive triangle edges that run approximately in the middle of highly curved areas. Vertices are also loosely positioned. To complete mesh related operations in Stage 2, the polylines (i.e., the "rivers") are widened and the Morse regions shrink. This is an important preprocessing step (i) to compute a clean and smooth feature skeleton in Stage 2, and (ii) compute smooth boundaries for the thickened feature skeleton in Stage 3, as shown in FIGS. 3.1*a*-3.1*e*, which illustrate Morse region boundaries, a feature skeleton and transition boundaries of connecting features, respectively, within a three-dimensional object.

Separator sets replace the zigzagged polylines by strips of triangles covering the unknown connecting features and subdividing edges, Block 290. This is accomplished by a growing process, which starts at the polylines. New triangles are added step by step until the translational strength falls below a certain threshold. In this way, a set of triangles is created, whose boundaries are close to the theoretical boundaries of the primary regions. Vertex blend areas also grow into the separator sets. At the innermost umbilical points, or at the T-nodes, where different connecting features merge, the translational strength is very weak or ill-defined. Consequently, region growing cannot proceed by the indicator values. Instead, the vertex triangles of the separator set are created by inheriting this property from the adjacent triangles, where the translation is sufficiently strong.

As the separator set is grown, the primary regions shrink. In this way triangles of the highly curved features will be assigned to the separator set, and only the triangles with relatively low curvature will remain in the primary regions. Finally, in order to enhance the quality of the regions and the separator sets, a few perfecting operations are performed, including the removal of small regions, small islands, and potential dangling regions, and smoothing the boundaries of the separator sets, Block 280.

Section 3—Stage 2 Details: Feature Skeleton Construction

The goal of Stage 2 is to produce a feature skeleton, which preserves the Morse segmentation of the model, Block 300. In the previous phase, all triangles of the polygonal mesh have been labeled and each triangle belongs to one of the primary regions or to the separator set. In Stage 2, a graph of polylines is computed that runs on triangle edges somewhere in the middle of the separator sets, and this will be replaced by a topologically identical feature skeleton, whose edges are smooth longitudinally and optimally located. The edges cut the sides of the triangles and connect repositioned vertices as shown in FIGS. 3.1a-3.1b

3.1—Classifying and Computing Edges

As described above, there are three types of edges: (i) feature edges run in the middle of the highly curved transitions, (ii) sharp edges approximate the theoretical intersection of adjacent primary surfaces and (iii) subdividing edges further partition large, smooth regions. For the different types of edges, different algorithmic steps will be performed.

Thinning Separator Sets and Stretching Edges

These operations use the previously generated separator sets of transitional regions. Thinning is based on a combination of the original indicator function values and another function that measures distance to the region boundary. In order to compensate numerical instabilities of the polygonal mesh, a fairing algorithm is used which eventually leads to a relatively smooth polyline connecting the two endpoints, whose positions were fixed earlier in the process.

The above procedure is combinatorially safe, but it may not be entirely sufficient in situations such as when the fixed vertex positions are not at their "best" locations and thus the connecting edges may need to be slightly tweaked. Fortunately, for the majority of edges, curve-tracing methods using a locally estimated translational direction yield geometrically well-aligned edges. This also changes the sequence of computations. First, good edge curves are computed, and then the vertices are repositioned together with the terminating part of the edges.

Tracing Curves

There are three types of tracing operations, Block 320. These operations include feature tracing, guided tracing and balanced tracing, which is a combination of feature tracing and guided tracing. The translational direction can be estimated robustly along feature curves and sharp edges using a local neighborhood (about 20-30 points) at every vertex of the triangulation. The translational vectors are also defined in any point inside the triangles by weighting the three vectors according to the barycentric coordinates of the given point.

The process of feature tracing starts at the middle point of the related separator set which is determined longitudinally by halving the arc-length of the related polyline. To locate this point in the cross-sectional direction, a similarity indicator is applied for the translational vectors, which will be the strongest in the middle of the strip. Operations associated with application of a similarity indicator are described in an article by P. Benko et al., entitled "Segmentation Methods for Smooth Point Regions of Conventional Engineering Objects," Computer-Aided Design, Vol. 36, pp. 511-523 (2004), the disclosure of which is hereby incorporated herein by reference. After defining the middle point, movement is made towards the two vertices at the ends. The estimated midpoint, the original polyline (shaded grey line) and the new traced edge (black) are shown in FIG. 3.2.

Tracing is analogous to solving a differential equation on the mesh, using a Runge-Kutta numerical integration. The middle curve by construction, always remains within the separator set. It is terminated when it (i) leaves the separator set, (ii) gets closed into itself, or (iii) reaches the boundary of the mesh.

If the translational vector field is weak or "ill-defined," then tracing as described above may not be possible. This complication occurs along smooth subdividing edges, or in vertex areas where the direction of the translational vector field cannot be robustly estimated. Guided tracing adaptively generates a curve satisfying positional and/or tangential constraints. Here, curve smoothing is also performed in a stepwise manner. For example, as the tracing gets closer to the vertex area, the strength of the translational field vanishes. Preserving the end tangent of the edge, a smooth connecting arc to the given vertex position is generated. This curve tracing will be repeated to meet the relocated vertices.

For many parts, "hybrid" feature curves can also occur, where a strong translational field gradually transitions into flat areas. In this case, the existing parts of the feature edges are connected and the original polyline in the middle is ignored.

Balanced tracing combines the benefits of feature tracing and guided tracing, taking an affine combination of the translational direction and a direction estimated at the guided point. The ratio used for this depends on the actual position within the feature. Typically, in the middle of the connecting feature region, the translational field is strong, so there is no problem. But, as the vertices are approached, it may be necessary to "turn" curves towards the vertices, so the guiding direction inherited from the polyline will gain a larger weight.

A simple example is shown in FIG. 3.3, where a vanishing feature is shown running from point A to C. Section AB represents a fillet, where there is a strong translational vector field, and thus feature tracing is applied, while on section BC there is no translational vector field and guided tracing is needed.

3.2—Sharp Edges

It can be important to distinguish between the edge types of the feature skeleton. Each feature edge represents a transition with an associated width, and it is helpful to replace it by a connecting feature surface. Subdividing edges lie in the middle of smooth regions and they are typically not widened. Sharp edges are never widened, but since they approximate theoretical intersection curves of adjacent surfaces, they need to be smoothed. This will affect the forthcoming operations as well.

Detect Sharp Edges

The first step is to detect sharp edges, and avoid handling them as very thin, smooth transitions. A sequence of functions $f_1, f_2, \ldots$ is used. Each $f_i$ chooses a neighborhood of the point under investigation and quantifies to which extent the normal vectors in that neighborhood fall into two distinct clusters. The detected signal depends on the size of the neighborhood (scale level), and the sequence is used to cover the spectrum from fine to coarse. A quantification can be made such that the absence of a signal (representing the fact that there are no pronounced two clusters) maps to zero. Then the new function $f = \Sigma f_i$ gives an indication to what extent there is evidence that the point belongs to a sharp edge, on any scale level. Additional information is obtained by considering which $f_i$ contribute (level of scale) and how many $f_i$-s contribute (sharpness relative to neighborhood size). To classify an edge, we average $f$ over a sample of points along the edge and finally use a threshold to arrive at the decision.

Enhancing the Mesh

This process is called edge-sharpening. The simplest edge-sharpening operation is to keep the original triangulation, and apply a relaxation process that straightens the mesh to agree with tangent planes obtained from the primary regions. This process may fail for noisy, unevenly distributed data. Alternatively, a narrow two-sided grid 23 with a sharp edge in the middle is fitted to the related data points. The points of the grid are attached to the original polygonal mesh, which is locally re-meshed at the end, as illustrated in FIG. 3.4.

3.3—Classifying and Repositioning Vertices

The vertices of the feature skeleton also need to be classified, since these determine the vertex blends in the final surface structure, Block 350. Depending on how the edges meet at a vertex, the vertices may be classified as (i) containing collinear edges, or (ii) of general type. The goal is to detect pairs of edges that are better routed straight through the vertex, as if they belonged to a single curve that passes through the vertex. Such a pair may be referred to as collinear since their tangents at the vertex are the same or approximately the same. Examples include the T-node, a vertex at which three edges meet, two of which are collinear, and the X-node, a vertex at which four edges meet, forming two collinear pairs. T-nodes typically occur due to uneven feature widths, or mixed convexity of edges, as was illustrated in FIG. 1.6. As described more fully hereinbelow, vertices with collinear edges (hereinafter "collinear vertices") induce a smooth connecting spring curve into the structure, which necessitates the use of setback-type vertex blends and modifies the final loops of the related primary faces.

Vertex Blend Indicator

There are various indicators that are suitable to roughly separate the connecting features and the vertex blend areas. As mentioned, the translational strength vanishes in the vertex areas. Alternatively, a maximum curvature indicator can be used to highlight the highly curved areas. If a value that selects the areas where the ratio of the principle curvatures is greater than a certain threshold, is superimposed, only the filleted edges will be obtained. What remains will represent the vertex blends. For example, in FIG. 3.5, the points P1, P2 and P3 represent good initial estimates for the setback values where the translational strength has fallen under a certain threshold. FIG. 3.5 shows how the original ragged polylines (drawn in black) are replaced by smooth edges of the feature skeleton (shaded grey); but in this case the initial position of the vertex blend V0 was preserved.

Detecting Collinear Vertices

It is a fundamental issue to detect those vertex blend configurations where an "ingoing" track naturally is continued along another "outgoing" track. At T-node vertex blends, the incoming and outgoing tracks have approximately the same radii, and there exists a smooth connecting arc that connects the mid-curve of the two edges. The tracks are estimated by curve tracing within the vertex blend area. For example, in FIG. 3.6, the track started at P1 will end near to P2, and the track at P2 will end at P1. The tracks started at P3 will end either at P1 or P2, depending on whether the start point is on the left or right side. Based on the mutual correspondence of the tracks P1 and P2, the hypothesis that a "T-node is present" is confirmed. For more complex vertex blends more than one collinear pair can occur. For general vertex blends, which have no collinear edges, the mid-curves can meet at an angle other than 180 degrees. Take for example the suitcase corner blend, where due to symmetry the mid-curves meet at 120 degrees as was shown in FIGS. 2.7*a*-2.7*b*.

Repositioning Vertices

Depending on whether a collinear or a general vertex is present, a different vertex repositioning procedure is applied. In the T-node case, the tracks from P1 and P2 run close to each other (i.e., in opposite directions, but parallel), so an appropriate blend between them yields a smooth, connecting arc between P1 and P2. Having the top of the T-node, the bottom feature curve can be extended. Starting at the setback point P3, the tangent of the bottom curve is preserved and tracing is performed until the internal arc is reached. As a result, the original vertex V0 in FIG. 3.5 can be repositioned into a new vertex V, as shown in FIG. 3.6.

For a general vertex blend, a new vertex position is set that minimizes the variance of the feature midlines joining there. The translational vector field cannot be used because it is very unstable in the middle of the vertex area. The new position is determined by minimizing the sum of the distances from the projected tangential lines starting at the setback points. This is done iteratively by calculating the gradient of the distance function and stepping into that direction. Once the new vertex position is determined, the feature midlines are regenerated from the setback points. In contrast to the linking of T-node legs, guided curve tracing is necessary. The initial step is taken into the tangent direction; the closer the step to the vertex, the more the target direction is used. This ensures that there will be no sharp turns on the connected edges of the feature skeleton.

Section 4—Stage 3 Details: Computing Boundaries for Features and Vertex Blends

The starting point is the feature skeleton with labeled edges and vertices indicating their basic properties. Based on this information, the smooth edges of the skeleton and the corresponding vertices are thickened (widened). These operations are similar to thickening the boundaries of the Morse complex, but the basic difference is that instead of zig-zagged polylines, smoothed boundary curves, aligned to the features of the object, are generated.

Initially, the potential self-intersection of boundary loops and the occurrence of degenerate vertex blends is disregarded. For each feature edge of the skeleton, operations are performed to generate a pair of longitudinal boundaries running "quasi-parallel" to the edge, and two terminating profile curves being "quasi-orthogonal" to the edge. The longitudinal boundaries can be traced and extended. However, the exact position of the profile curves can only be determined after computing the setbacks and the spring curves of the related two vertex blends. Based on these operations, sharp edges and smooth subdividing edges generally remain as they are, and only feature edges are replaced by pairs of feature boundaries.

4.1—Locating Boundaries for Connecting Features

Boundaries for connecting features may be located using at least the following methods.

Boundaries by Curve Tracing

One method for locating boundaries places them so they approximate the boundaries of the separator sets obtained after the Morse complex segmentation. More specifically, it bases its decisions on the translational vector field used earlier to identify the middle edge of the feature. While the middle curve was placed at the cross-sectional maximum of a similarity indicator, the feature boundaries are placed at the two adjacent cross-sectional minima of the same indicator, as shown in FIG. 4.1: point C is on the mid-curve; point A is on the primary surface, where the vector field practically vanishes; and point B, which is on the feature boundary, shows a strong dissimilarity because one side of the translational vector field is weak and the other side is strong.

Due to the presence of noise on measured data sets, further considerations are taken to numerically stabilize boundary curve tracing. It can be assumed that the estimations are the most stable in the middle of the features. The center point computed earlier is considered (see, FIG. 3.2) and the width of the feature is determined in the cross-sectional direction. Tracing then starts to the left and right, as was previously described. Here, (i) the local translational direction, (ii) the guiding direction of the related mid-curve, and a (iii) stabilization factor that prevents undesirable oscillations, are combined. The feature boundaries run on the mesh cutting the triangles. In general, these are not parallel to the mid-curves (see, e.g., fillets with varying width running on curved primary surfaces).

Boundaries by Rolling Balls

A second method for locating boundaries is appropriate only in such situations where the connecting feature can be well approximated by a rolling ball blend model. The motion of the ball with either constant or varying radius uniquely defines the feature boundaries on the mesh. In the first case of a constant radius, a longitudinal spine curve and a radius need to be computed. In the second case of a varying radius, a spine and an associated radius function are needed.

Extending Boundary Curves

For the forthcoming computations, the boundary curves need to be extended, being forced to run on the mesh. For convex corners, the boundary curves are extended until they meet the adjacent edge curves of the feature skeleton, as illustrated by FIG. 4.2a. For concave angles, as shown in FIG. 4.3a, the boundary curves are extended until meeting the bisecting curve $T_p$ starting at corner P. In the later phase of the algorithm either (i) the boundary curves, or their extension get intersected, or (ii) a spring curve will be inserted.

In the first example in FIG. 4.2a, boundary b1 is extended until edge e2, boundary b2 is extended up to edges e1 and e3, etc. In most cases, two longitudinal boundaries will be obtained on each side of an edge, and the internal boundary loop inherits the edge loop structure of the feature skeleton as shown by the boundaries e1-e2-e3 and b1-b2-b3 in FIG. 4.2a. In other cases, some of the longitudinal boundaries may vanish due to the width of transitions. In FIG. 4.2b, the boundary b2 vanishes and the originally disjoint vertex blends around points P and Q merge. As a result, an "artificial" spring curve $s_{PQ}$ is inserted to connect the shrunk boundaries b1 and b3.

In the second example, the original edge sequence of the feature skeleton e1-e2-e3-e4 in FIG. 4.3a is almost preserved, but at corner P a new element is inserted resulting in an edge sequence b1-b2-$s_P$-b3-b4, as shown by FIG. 4.3b.

4.2—Edge Loops for Setback Vertex Blends

The basic principles of using setback vertex blending will now be explained by using a few examples. Starting with the well known "suitcase corner" at the junction of three planar patches, which connects three edge blends, as shown in FIG. 4.4a, the corresponding vertex blend is a 3-sided patch, which can be represented by an octant of a sphere. One simple approach to create a vertex blend is to intersect the boundaries (trimlines) of two edge blends meeting on the same primary face and use these points as corner points for the 3-sided patch. The general situation, however, is much more complicated and may require forming blends for junctions at which an arbitrary number of edges can meet. These edges can be locally convex or concave, and the angles between them are not necessarily close to 90 degrees. In this case, the edge blends may vary from high to low cross-sectional curvature. To make things even more complicated, allowance is made for the possibility to keep an edge sharp without replacing it by a blend. To deal with these complex cases, the idea of using setbacks is considered, in which the boundaries of the edge blends are terminated before they reach the intersection points. The termination points are connected by "spring curves", and a larger surface piece is inserted, as shown in FIG. 4.4b. Setbacks help to avoid difficult shape configurations. This can be illustrated by FIGS. 4.4c and 4.4d. Aesthetically more pleasing setback vertex blends are shown in FIGS. 4.4e and 4.4f.

A setback-type vertex blend has maximum of 2n-sides, where in the most general case n spring curves and n profile curves alternate. This is illustrated in FIG. 4.5, where e1-e3 denote the original unblended edges and sb1-sb3 denote the distances from the original unblended vertex where the edge blends are terminated. The setbacks sb1-sb3 are bounded by profile curves p1-p3 and s12, s23 and s31 denote the spring curves connecting the boundaries of the related edge blends of edges e1/e2, e2/e3 and e3/e1, respectively.

Once again, profile curves represent common borders between edge blends and vertex blends, and they smoothly connect two corner points, which lie on the two corresponding primary surfaces. Spring curves represent common borders between primary faces and vertex blends, and they smoothly connect two previously computed longitudinal boundaries of corresponding two edge blends. Depending on the geometric configuration, the length of any of these curves can be chosen to be zero, and the resulting vertex blend may be treated as a degenerate faun of the 2n-sided blend. As illustrated in FIG. 4.3g, a single spring curve and two zero-length spring curves can make this vertex blend four-sided. As illustrated in FIG. 4.3h, a profile curve can also have zero length if the corresponding edge is sharp and is not replaced by a blend.

Setbacks and Spring Curves

The setback concept is heavily used in the shape reconstruction context here when it is necessary to determine the best configuration of unknown vertex blends. Related parameters and properties have already been estimated in the previous steps. By determining the widths of the individual connecting features, the final setback values can be computed to determine the position of the profile curves. For example, in FIG. 4.5 the setback value sb1 is computed by taking into consideration the maximum width of edge features e2 and e3. In some cases, an optional, positive correction term is added to push setbacks further off either for aesthetic reasons, or to handle degenerate situations, such as cuspate or tangential edges. Difficult cases include edge blends with uneven radii and extreme angles, and feature configurations that were shown earlier in FIG. 4.2b and 4.3b. Vertex blend design must accord with the type of the vertex (T-node, X-node, etc.) previously determined. For example, if the feature skeleton has a collinear edge pair, spring curve insertion is compulsory. Otherwise, the two trimlines are simply intersected. Upon completion, the number of sides of the vertex blend will be equal to the number of profile curves plus the number of spring curves.

Section 5—Stage 4 Details: Surface Structure Creation

In Stage 2, the basic region structure of an object was defined, and a feature skeleton with assigned structural attributes were determined. In Stage 3, various geometric entities that are needed for computing a thickened feature skeleton were determined. This skeleton is the boundary curve network of the final surface structure. During thickening, each edge is replaced by a pair of longitudinal boundaries, and each of the vertices is replaced by loops of edges.

Now, in Stage 4 the exact boundaries for the primary regions, the connecting features and vertex blends are computed. This region structure and the boundaries correspond to the faces and edge curves of the final CAD model, where the point set of each region will be approximated by an individual surface. Three different surface structures are proposed in decreasing order of complexity, illustrated by a very simple example with three edge blends, as shown in FIG. 5.1, where CFi, i=1, 2, 3 denote the connecting features; VB is a vertex blend; P, Q, R denote the common points where the boundaries of the connecting features intersect or get connected.

5.1—Three Surface Structures

Model A—This is the most general structure, Block 760 (FIG. 1.4), that contains (i) primary regions, (ii) connecting features and (iii) setback vertex blends. Two A-type models (A1 and A2) are illustrated in FIG. 5.1. The boundary loops of the primary regions are composed of thickened longitudinal feature boundaries and spring curves together with sharp and subdividing edges, which are not thickened. Each primary region is bounded by a perimeter loop of edges and may have an arbitrary number of internal loops. The always four-sided connecting features lie between two primaries and two vertex blends. Vertex blends are bounded by profile curves and spring curves, and degenerate (zero-length) curve elements are handled as well.

Model B—In this alternative surface structure, Block 770 (FIG. 1.4), quadrangular regions are used for the connecting features, but no spring curves will be inserted for the vertex blends. This means that the topological structure will be simpler, but the boundary curves of the thickened feature skeleton will be more complex. For n connecting features, an exactly n-sided vertex blend will be created. The boundary loops of the primary regions will be composed of only the boundaries of the features. As illustrated in FIG. 5.1 (model B illustration), first appropriate corner points need to be determined for the vertex blends either by (i) intersecting the trimlines (points P or Q), or (ii) locating auxiliary points on the primaries (point R on Region B). Auxiliary points are needed in cases where earlier spring curves were inserted.

In this structure, profile curves are generated by connecting pairs of corner points. These curves must be tangential to the related primary regions. The feature boundaries are taken from Stage 3, running "quasi-parallel" to the midlines of the features until they reach the vertex areas. At curve-curve intersections, nothing more is needed. For auxiliary points, a guided curve tracing will extend the original trimlines until they tangentially meet.

Model C—Although a conventional CAD modeler would rarely produce this sort of surface structure, Block 780 (FIG. 1.4), the third model was formed for topological simplicity and in order to adopt to sharp edge structures. In this case, there are no vertex blends at all. Thickening the feature skeleton is relatively simple: each edge will be replaced by a pair of feature boundaries, which meet at intersections or auxiliary points as described for Model B. The basic difference is that each quadrangle face is composed of a real feature part plus two attached connecting pieces at the ends. A connecting piece runs into the common vertex of the original skeleton and shares two short, half boundaries with the adjacent features.

5.2—Self-Intersections

In computer aided geometric design there are many models with interfering blended edges or connecting features. Thus, it is necessary to deal with related problems in the reconstruction process. The problem may be illustrated through a few simple examples.

Consider the bow-tie-like primary region in FIG. 5.2a-5.2d. A part of the feature skeleton is shown. The original loop of edges (thick line) is thickened inwards to get the boundary loop of the final shrunk face. In simple cases there is a one-to-one correspondence between the original and thickened topology (see, FIG. 5.2a). The sequence of the thickened edges corresponds to the sequence of the original skeleton edges. The corner points of the vertex blends (e.g., Q1) correspond to the original vertices of the loop (Q). However, vertices with concave angles produce spring curves. This is illustrated by spring curve S and point P in FIG. 5.2a. When the width of the thickened boundary curves is relatively large, the edge loop may become self-intersecting, as shown by FIG. 5.2b. Two different strategies will now be described in response to the detection of self-intersections, Block 720.

Preserving the Original Loop Structure

The first strategy enforces a topologically identical edge-vertex structure in the above-described sense, Block 740. It is known that each subregion of a Voronoi diagram is associated with a particular element of the boundary, so the thickened edges are relocated in such a way that they do not penetrate the "opposite" Voronoi regions. If thickening is performed with different widths, the distance measures associated with the individual boundary elements will be different and a weighted Voronoi diagram will be used. In order to get a well-separated loop, the relocated parts and the original loop need to be smoothly merged keeping the non-interfering parts untouched. Such a thinned structure is shown in FIG. 5.2c.

Creating a New Loop Structure

An alternative solution, Block 750, includes creating a modified topological structure during thickening, which is not yet reflected in the current feature skeleton, but likely to lead to the best possible structure. In the previous section, the example of FIG. 4.2 was provided where a potential boundary edge b2 collapsed, and a merged vertex blend with an auxiliary spring curve $s_{PQ}$ was created. Returning to the bow-tie face, if the two interfering edge-loop portions are merged, a complex vertex blend in the middle is obtained, whose top part is shown in FIG. 5.2d. Instead of a single edge loop, the shrunk primary face will fall into two parts: the side parts of the original loop are preserved, but new spring curves need to be inserted, being shared by the middle vertex blend.

The first solution is simple from an algorithmic point of view, but it cannot yield a perfect thickened feature skeleton, and this may influence the surface quality of the final model. The second solution is much more complex because the one-to-one topological correspondence is lost, but it leads to a better separation of the primary regions, which may be an important requirement in shape reconstruction.

Section 6—Extensions to Other Forms of Three-Dimensional Object Data

The process of digital shape reconstruction typically starts with paint data, as obtained from range scanners or line scanners. The operations described in the previous sections use a dense polygonal mesh as the fundamental data structure that stores connectivity and adjacency information as well. For certain applications, however, it may be desirable to perform the structural decomposition on point clouds, as opposed to only triangulations.

The memory requirements of polygonal models are much higher than those of point clouds with the same number of points. Very large point sets, often tens of millions of data points, are frequently necessary to perform accurate digital shape reconstruction. For computational and storage efficiency reasons, it is impractical to arrange all measured data points into a mesh format. However, when point clouds are filtered or meshes are decimated to reduce data structure size, important surface information may be lost and computational accuracy may be reduced. To address these limitations associated with using polygonal models, alternative point cloud-based embodiments of the invention will be described that limit loss of object surface information due to decimation, produce much "lighter" models and increase computational efficiency even for very large data sets.

In the above-described embodiments of surface structure generation, vertices of the triangulation were used, and no other points besides the vertices of the triangles were typically accessible. However, by using a point cloud representation of a three-dimensional surface, a strongly decimated polygonal mesh can be generated, but in such a way that the original points of the point cloud are preserved in a structured format. Although the removal of redundant data points is acceptable in flat regions, and can be performed in such a way that tolerances to the original data are maintained, many more data points need to be preserved around features of high curvature. Two data structures will be considered. The first data structure is a decimated mesh that preserves the topology and creates a natural parameterization, but can be extended by assigning each point of the data set that is not included as a vertex of the mesh, to its "underlying" triangle. A second data structure is based on a volumetric decomposition of the three-dimensional space, where octrees or cubicals are computed using adaptive distance fields (ADF). Aspects of ADF, which are described in an article by S. F. Frisken et al., entitled "Adaptively Sampled Distance Fields: A General Representation of Shape for Computer Graphics, SIGGRAPH, pp. 249-254 (2000). Point assignment in the second data structure is based on efficient search algorithms that exploit the given spatial arrangement of the points. In this way, a mutual correspondence is established, with each point on the decimated mesh defining a local neighborhood of the point cloud, and each data point corresponding to a parameterized point on the decimated mesh. One significant feature of the point cloud model is that the most accurate representation of the scanned data having the original point cloud is preserved. Thus, the indicator functions and the translational vector field can be evaluated directly on it, as opposed to using only the vertices of a dense polygonal model.

In order to handle point cloud data, the above-described hierarchical Morse segmentation described with respect to Stage 1 processing will typically be changed in two computational aspects. The evaluation of the indicator functions will be more accurate, but sampling will be less dense, and the separating polylines will typically be more ragged than in the dense polygonal model case. With respect to Stage 2 processing, instead of using simple polylines with single straight segments for each triangle of the triangulation, a more accurate subdivided polyline representation can be used in the decimated mesh case. Curve tracing and vertex repositioning operations are similar, but larger triangles are used and the internal points are not necessarily "glued" to the larger triangles. Instead, the internal points are only associated with a point of a corresponding triangle, and can be positioned above or below the triangle. Finally, with respect to Stage 4 processing, a significant processing difference is typically required. In the case of using a dense polygonal mesh, every vertex belonged to a particular face, so the points to be approximated after creating the thickened surface structure are functionally dependent on the prior operations. In contrast, in the case of using a point cloud, a surface structure with many associated points is obtained. Surface fitting can then be performed using all local points for a given region, which may be inefficient, or a more efficient sampled subset of points may be used that is determined by local curvature or the ADF structure.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A computer-implemented method of reconstructing a surface structure from at least one three-dimensional polygonal mesh, comprising:
   partitioning three-dimensional object data into regions of a Morse complex, said Morse complex comprising a plurality of distinct Morse functions;
   generating a feature skeleton having a plurality of edges and a plurality of vertices that extend between the regions of the Morse complex and lie on a surface of the at least one three-dimensional polygonal mesh; and
   thickening the feature skeleton by replacing the plurality of edges with corresponding pairs of curves that locate longitudinal boundaries of transitions between primary regions of the feature skeleton, said replacing comprising characterizing local curvature properties of the three-dimensional polygonal mesh;
   wherein said partitioning, said generating and/or said thickening comprise operations performed on a processor.

2. The method of claim 1, wherein the plurality of edges and the plurality of vertices have assigned structural attributes.

3. The method of claim 2, wherein said thickening step comprises replacing each of the plurality of vertices with a corresponding loop of edges.

4. The method of claim 2, wherein said thickening step comprises replacing each of the plurality of vertices with a corresponding loop of edges using setback-type vertex blends.

5. The method of claim 1, wherein said partitioning step comprises partitioning the three-dimensional object data using at least one indicator function selected from a group including slippability, sweepability and proximity.

6. The method of claim 1, wherein said partitioning step comprises partitioning the three-dimensional object data using a combination of different indicator functions.

7. The method of claim 6, wherein said partitioning step comprises partitioning the three-dimensional object data using a weighted sum of different indicator functions.

8. The method of claim 1, wherein said partitioning step is performed sequentially by partitioning the three-dimensional object data into a first partition using a first indicator function and further partitioning the first partition into a second partition using a second indicator function.

9. The method of claim 1, wherein said partitioning step comprising partitioning the three-dimensional object data into regions of a Morse complex using a weighted sum of different indicator functions having weights determined by iterative learning operations that are constrained by markers assigned to the three-dimensional object data.

10. The method of claim 1, wherein said partitioning step comprises generating a hierarchy of topologically simplified partitions of a Morse complex.

11. The method of claim 10, wherein said partitioning step further comprises selecting one of the partitions in the hierarchy using a sensitivity value.

12. The method of claim 1, further comprising:
   replacing at least one of the plurality of vertices with a loop of edges;
   detecting at least one self-intersection between transitional boundaries of the thickened feature skeleton; and
   modifying the loop of edges in response to detecting the at least one self-intersection;
   wherein said replacing, said detecting and/or said modifying comprise operations performed on a processor.

13. A computer-implemented method of reconstructing a surface structure from at least one three-dimensional polygonal mesh, comprising:
- partitioning three-dimensional object data into regions of a Morse complex, said Morse complex comprising a plurality of distinct Morse functions;
- generating a feature skeleton having a plurality of edges and a plurality of vertices that extend between the regions of the Morse complex and lie on a surface of the at least one three-dimensional polygonal mesh; and
- thickening the feature skeleton by evaluating local curvature properties of the three-dimensional polygonal mesh and replacing the plurality of edges with corresponding pairs of curves that locate longitudinal boundaries of transitions between primary regions of the feature skeleton;
- wherein said partitioning, said generating and/or said thickening comprise operations performed on a processor.

14. A computer-implemented method of reconstructing a surface structure from at least one three-dimensional polygonal mesh, comprising:
- partitioning three-dimensional object data into regions of a Morse complex, said Morse complex comprising a plurality of distinct Morse functions;
- generating a feature skeleton having a plurality of edges and a plurality of vertices that extend between the regions of the Morse complex and lie on a surface of the at least one three-dimensional polygonal mesh; and
- thickening the feature skeleton by evaluating local properties of the three-dimensional polygonal mesh using indicator functions and replacing the plurality of edges with corresponding pairs of curves that locate longitudinal boundaries of transitions between primary regions of the feature skeleton;
- wherein said partitioning, said generating and/or said thickening comprise operations performed on a processor.

* * * * *

UNITED STATES PATENT AND TRADEMARK OFFICE
CERTIFICATE OF CORRECTION

PATENT NO. : 8,004,517 B1 Page 1 of 1
APPLICATION NO. : 11/426094
DATED : August 23, 2011
INVENTOR(S) : Edelsbrunner et al.

It is certified that error appears in the above-identified patent and that said Letters Patent is hereby corrected as shown below:

In the Patent:

Column 15, Line 37: Please correct "$G(f(x_{i1})=1$" to read -- $G(f(x_{i1}))=1$ --

Line 38: Please correct "$G(f(x_{i1})=0$" to read -- $G(f(x_{i1}))=0$ --

Line 41: Please correct "$I_2(t)=\Sigma_{jl}\text{sigm}_2$"

to read -- $I_2(t)=\Sigma_{jl}d^2_{jl}\text{sigm}_2$ --

Column 16, Line 42: Please correct "$v= v_{-j+1}$" to read -- $v= v_{m \wedge j+1}$ --

Signed and Sealed this
Twenty-ninth Day of November, 2011

David J. Kappos
*Director of the United States Patent and Trademark Office*

UNITED STATES PATENT AND TRADEMARK OFFICE
CERTIFICATE OF CORRECTION

PATENT NO.           : 8,004,517 B1
APPLICATION NO.      : 11/426094
DATED                : August 23, 2011
INVENTOR(S)          : Edelsbrunner et al.

It is certified that error appears in the above-identified patent and that said Letters Patent is hereby corrected as shown below:

In the Patent:

Column 15, Line 37: Please correct "$G(f(x_{i1})=1$" to read -- $G(f(x_{i1}))=1$ --

Line 38: Please correct "$G(f(x_{i1})=0$" to read -- $G(f(x_{i1}))=0$ --

Line 41: Please correct "$I_2(t)=\Sigma_{jl} sigm_2$"

to read -- $I_2(t)=\Sigma_{jl} d^2_{jl} sigm_2$ --

Column 16, Line 42: Please correct "$v= v_{-j+1}$" to read -- $v= v_{m-j+1}$ --

This certificate supersedes the Certificate of Correction issued November 29, 2011.

Signed and Sealed this
Fourteenth Day of February, 2012

David J. Kappos
*Director of the United States Patent and Trademark Office*